United States Patent
Crosby

(10) Patent No.: US 10,029,812 B1
(45) Date of Patent: Jul. 24, 2018

(54) SYSTEM AND METHOD FOR COVERING STACKS OF BIOMASS

(71) Applicant: Lon Owen Crosby, Webster City, IA (US)

(72) Inventor: Lon Owen Crosby, Webster City, IA (US)

( * ) Notice: Subject to any disclaimer, the term of this patent is extended or adjusted under 35 U.S.C. 154(b) by 100 days.

(21) Appl. No.: 14/667,627

(22) Filed: Mar. 24, 2015

Related U.S. Application Data

(60) Continuation-in-part of application No. 14/453,560, filed on Aug. 6, 2014, which is a continuation-in-part of application No. 13/798,069, filed on Mar. 12, 2013, now Pat. No. 9,578,807, which is a division of application No. 13/018,410, filed on Jan. 31, 2011, now Pat. No. 8,393,137, which is a continuation-in-part of application No. 11/824,845, filed on Jul. 3, 2007, now Pat. No. 7,877,970.

(60) Provisional application No. 60/818,988, filed on Jul. 5, 2006.

(51) Int. Cl.
| | |
|---|---|
| B60P 7/04 | (2006.01) |
| B65H 75/42 | (2006.01) |
| B65H 75/44 | (2006.01) |
| B65B 11/02 | (2006.01) |
| B65B 51/05 | (2006.01) |
| A01F 25/13 | (2006.01) |

(52) U.S. Cl.
CPC ............ *B65B 11/02* (2013.01); *A01F 25/13* (2013.01); *B65B 51/05* (2013.01)

(58) Field of Classification Search
None
See application file for complete search history.

(56) References Cited

U.S. PATENT DOCUMENTS

| | | | | |
|---|---|---|---|---|
| 5,388,882 A | * | 2/1995 | Russell | B60P 7/04 296/100.14 |
| 2010/0032978 A1 | * | 2/2010 | Miller | B60J 7/085 296/98 |
| 2014/0034771 A1 | * | 2/2014 | Hecker | B65H 49/325 242/395 |
| 2017/0297473 A1 | * | 10/2017 | Baareman | B60P 7/04 |

* cited by examiner

*Primary Examiner* — Mussa A Shaawat
*Assistant Examiner* — Kyung Kim
(74) *Attorney, Agent, or Firm* — Steven C. Wichmann

(57) ABSTRACT

A biomass stack covering system for applying a tarpaulin sheet on a stack of biomass bales includes a motorized vehicle having at least one steerable and driven axle and an articulated arm affixed to and movable with respect to the motorized vehicle. The articulated arm is operably configured to extend horizontally and vertically and to pivot at a proximal end thereof with respect to the motorized vehicle. A tarpaulin dispensing apparatus is operably connected to a distal end of the articulated arm and is articulable thereabout. The dispensing apparatus is configured to rotationally retain a tarpaulin roll thereon and dispense a tarpaulin sheet from the tarpaulin roll onto the Bale stack by unrolling the tarpaulin sheet from the tarpaulin roll.

20 Claims, 14 Drawing Sheets

SYSTEM AND METHOD FOR COVERING STACKS OF BIOMASS

CROSS-REFERENCE TO RELATED APPLICATION

This Non-Provisional Utility application is a continuation-in-part of U.S. Non-Provisional application Ser. No. 14/453,560 filed on 6 Aug. 2014, which is a continuation-in-part of U.S. Non-Provisional application Ser. No. 13/798,069 filed on 12 Mar. 2013, which is a division of U.S. Non-Provisional application Ser. No. 13/018,410 filed 31 Jan. 2011, issued as U.S. Pat. No. 8,393,137 on 12 Mar. 2013, which is a continuation-in-part of U.S. Non-Provisional application Ser. No. 11/824,845, filed 3 Jul. 2007, issued as U.S. Pat. No. 7,877,970 on 1 Feb. 2011, which are included in their entirety herein and claim the benefit of U.S. Provisional Patent Application Ser. No. 60/818,988, filed on 5 Jul. 2006, which is also incorporated herein in its entirety.

FIELD OF THE INVENTION

The present invention relates to agricultural harvesting of biomass and more particularly to a system for covering a stack of biomass units to provide protection from the elements.

BACKGROUND OF THE INVENTION

In recent years our society and the world in general has become increasingly more and more energy dependent. The resulting rise in energy demands have coupled with rising costs for petroleum based fuels to kindle an increased interest in alternative fuels that once may have been considered too costly to produce. Of particular interest are fuel sources that are considered to be 'renewable.' One of these renewable and alternative energy sources is commonly referred to as biomass.

Biomass generally includes living and recently dead biological material which can be used as fuel or for industrial production. Most commonly, biomass refers to plant matter grown for use as biofuel, but it also includes plant or animal matter used for production of fibers, chemicals or heat. Biomass may also include biodegradable wastes that can be burned as fuel, but it excludes organic material which has been transformed by geological processes into substances known as fossil fuels such as coal or petroleum.

Typical sources of biomass include several plants such as miscanthus, switchgrass, hemp, corn, poplar, willow and sugarcane. The particular plant used is usually not very important to the end products, but it does affect the processing of the raw material. Production of biomass is a growing industry as interest in sustainable fuel sources is growing. While the term biomass is also useful to identify plants where some of the plant's internal structures may not always be considered living tissue, such as the wood of a tree, and even though this biomass was produced from plants that convert sunlight into plant material through photosynthesis, the use of the term 'biomass' herein is by definition limited to agricultural plant growth that is harvested on a regular and periodic basis as part of an agricultural enterprise.

A major source of this biomass results from agricultural activities wherein the plant growth is produced specifically as a biomass product or alternatively is the residue of grain based agricultural crops. Traditionally, agricultural crop residues have been left on the field and reworked into the field's topsoil layer with the intent to return those nutrients removed during the crop's growth cycle and stored in the residue. Studies have revealed that sufficient and even optimal tilth levels in the topsoil layer can be maintained by returning only a fraction of the agricultural crop residue from a particular growth cycle. Until recently, there has been no particular incentive to remove the excess residue from agricultural fields other than for other agricultural uses such as bedding materials or low grade feed for agricultural livestock. However, with the interest in biomass as a renewable energy source, biomass can also now be considered an additional income source from the agricultural growth cycle to supplement the income derived from the harvested grains.

The desire to also harvest biomass from agricultural fields is tempered by the necessary caution to refrain from removing an excess of biomass and thus gradually depleting the topsoil nutrient levels after successive years of harvests. The nutrient needs of the topsoil vary geographically and even vary within the boundaries of a particular field such that determining harvestable quantities is location specific problem and not governed by general parameters applicable across an entire field. Such determinations must be made by an intelligent system that analyzes the topsoil layer concurrent with the harvesting of the biomass.

The composition of biomass is controlled by genetics, and consequently the production and subsequent harvesting of specific genetic lines can result in a product which allows biomass utilization processes to be optimized. For example, if one is using cellulose from corn fodder biomass to produce ethanol via a fermentation process, the value of a unit of biomass increases as the percentage of cellulose increases. Similarly, a company producing an adhesive through a chemical process will find value in corn genetic lines with high lignin levels. In all cases, moisture is invariably a critical factor since excess moisture reduced dry weight in a unit of biomass and increases transportation costs; can also lead to spoilage within a biomass unit. Moisture typically has to be removed during the pre-processing steps to enable particle size reduction, etc.

The concept that the chemical composition of plant biomass is influenced by a wide range of uncontrolled factors which vary across a field such as soil type, effective moisture availability, soil microflora (type & levels), etc. is not widely understood. Also less widely understood is that the chemical composition of plants can also be influenced by production management practices, such as fertilization, use of plant hormones (both natural and synthetic), irrigation, etc.

The resulting variation in biomass quality attributes creates the need for defining the physical source of a unit of biomass and the need for acquiring and tracking quality attributes at biomass harvesting/packaging (as well as during subsequent steps). Common attributes to be tracked may include unit weight, moisture percentage, lignin percentage, cellulose percentage, hemicellulose percentage, and other attributes.

The value of maintaining traceability of discrete biomass units is enhanced when the biomass source has discrete attributes (with positive and negative value depending upon the specific biomass utilization process) resulting from plant genetics, soil characteristics, production practices, etc. The value of maintaining traceability of discrete biomass units is further enhanced when the harvesting or packaging system has components which objectively characterize the unique attributes of a specific unit of biomass such as physical, chemical, biological, etc. components.

To optimize the value of the biomass being harvested and offered for sale, the producer needs to know the source location and the critical quality attributes relate to physical, chemical and biological properties of each biomass unit relative to the anticipated end use. Therefore, the optimization of the value of the biomass being purchased and subsequently utilized in a specific biomass utilization process depends upon knowledge of the source location and critical quality attributes related to physical, chemical and biological properties of each biomass unit. The biomass industry has implemented a variety of schemes for tracking discrete units of biomass. These tracking schemes have typically been borrowed from the larger logistics world. Tracking system examples include physical labels, barcodes in both 1D, 2D and 3D constructs, RFID systems, etc. These systems add complexity and expense to the logistics process associated with the harvesting, transport and storage of biomass.

Once the biomass units have been produced and collected they are often accumulated and arranged into stacks while awaiting use in various industrial processes (co-firing, gasification, fast pyrolysis, chemical extraction, fermentation, etc.) optimized for the processing of biomass. All of these processes have definable limits on the moisture content of the feedstock. Some of these limits are defined by the requirements for using a dry grind process for particle size reduction prior to other process steps while others are limited by process requirements per se such as moisture limits in fast pyrolysis. Regardless, there is typically a common need to store and protect the biomass-based raw materials from the weather and natural degradation processes.

The biomass is frequently stored in stacks of bales of various sizes which are then manually covered by tarps of various kinds. The parking process is labor intensive and exposes workers to a number of significant occupational hazards including falls. Covering a stack of biomass while meeting the worker protection requirements established by OSHA is difficult. Risk to the workers is particularly acute when the workers are required to use ladders for access to the top of the stack or to secure the tarp or the film to the side of the stack. The stacks are frequently built six to eight bales in height (nominally 16 to 32 feet) or more. These heights are far beyond OSHA limits for unprotected worker activities.

Because of the nature of the biomass and the fact that the bales themselves comprise the supporting structure of the stack, individuals working on the top of the stack are unprotected by either railings or other restraint systems and thus are subject to falls from edges of the stack. In addition, the stacking process can create voids and crevices between bales into which a worker can accidentally step, especially when the void or crevice may be covered by a thin layer of biomass residue.

Therefore, a reliable and low cost system for covering a stack of bales to protect the bales from the elements without exposing workers to prohibited activities in the workplace is needed.

SUMMARY OF THE INVENTION

The present disclosure is generally directed to a biomass stack covering system for applying a tarpaulin sheet on a stack of biomass bales. The covering system includes a motorized vehicle having at least one steerable and driven axle and an articulated arm affixed to and movable with respect to the motorized vehicle. The articulated arm is operably configured to extend horizontally and vertically and to pivot at a proximal end thereof with respect to the motorized vehicle. A tarpaulin dispensing apparatus is operably connected to a distal end of the articulated arm and is articulable thereabout. The dispensing apparatus is configured to rotationally retain a tarpaulin roll thereon and dispense a tarpaulin sheet from the tarpaulin roll onto the Bale stack by unrolling the tarpaulin sheet from the tarpaulin roll.

In another aspect, the dispensing apparatus includes a cantilevered boom extending away from the distal end for receiving thereon the tarpaulin roll.

In still another aspect, the boom is arcuately articulable between at least a horizontal orientation and a vertical orientation.

In yet another aspect, the motorized vehicle includes a rack for storage of at least one tarpaulin roll. The tarpaulin roll is accessible and selectively removable by the cantilevered boom.

In a still further aspect, the dispensing apparatus includes a tensioning unit to maintain a linear tension of the tarpaulin sheet during application of the tarpaulin sheet to the bale stack.

In another aspect, the tensioning unit passively maintains a linear tension of the tarpaulin sheet during placement on the bale stack.

In another aspect, the tensioning unit is actively powered to maintain a selected tension of the tarpaulin sheet during placement on the bale stack.

In a still further aspect, the dispensing apparatus includes at least one stapler for insertion of a plurality of biodegradable staples through the tarpaulin sheet into the Bale stack for fastening the tarpaulin sheet to the bale stack.

In yet another aspect, the covering system further includes at least one intermediary wheel rotatably mounted on a vertically oriented intermediary axle affixed to a side of the motorized vehicle and extending upwardly therefrom. The purpose of the intermediary wheel is for bearing against a side of a bale stack to prevent the motorized vehicle from tipping when the articulated arm overbalances the motorized vehicle.

In another aspect, the intermediary axle is selectively deployable between a horizontal orientation and a vertical orientation.

In still another aspect, the at least one intermediary wheel is selected from the group consisting of a plurality of wheels arranged inline one with the others and a tracked mechanism.

In yet another aspect, the motorized vehicle further includes a driven and steerable rear axle.

In another aspect, the tarpaulin dispensing apparatus includes at least one guide wheel attached thereto for maintaining a uniform distance between the cantilevered boom and a surface to which the tarpaulin sheet is being applied.

In a further aspect, a biomass stack covering system for applying a tarpaulin sheet on a stack of biomass bales. The covering system includes a motorized vehicle having two drop axles, at least one of the drop axles being steerable and driven. An articulated arm is affixed to and movable with respect to the motorized vehicle and is operably configured to extend horizontally and vertically and to pivot at a proximal end thereof with respect to the motorized vehicle. A tarpaulin dispensing apparatus is operably connected to a distal end of the articulated arm. The dispensing apparatus includes a cantilevered boom extending away from the distal end and is articulable between at least a horizontal orientation and a vertical orientation. The cantilevered boom is configured to rotationally retain a tarpaulin roll thereon and dispense there from a tarpaulin sheet onto the bale stack by unrolling the tarpaulin sheet from the tarpaulin roll. The dispensing apparatus also includes a tensioning unit to maintain a linear tension of the tarpaulin during application of the tarpaulin to the bale stack.

In another aspect, the motorized vehicle includes a rack for storage of at least one tarpaulin roll, the tarpaulin roll accessible and selectively removable by the cantilevered boom.

In yet a further aspect, the tensioning unit passively maintains a linear tension of the tarpaulin sheet during placement on the bale stack.

In still another aspect, the tensioning unit is actively powered to maintain a selected tension of the tarpaulin sheet during placement on the bale stack.

In yet another aspect, the dispensing apparatus includes at least one stapler for insertion of a plurality of biodegradable staples through the tarpaulin sheet into the bale stack for fastening the tarpaulin sheet to the bale stack.

In a still further aspect, the covering system further includes an intermediary brace selected from the group consisting of a plurality of wheels arranged inline one with the others and a tracked mechanism, the intermediary brace rotatably mounted on at least one vertically oriented intermediary axle affixed to a side of the motorized vehicle and extending upwardly therefrom. The purpose of the intermediary brace is for bearing against a side of a bale stack to prevent the motorized vehicle from tipping when the articulated arm overbalances the motorized vehicle.

In another aspect, the intermediary axle is selectively deployable between a horizontal orientation and a vertical orientation.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference is made to the accompanying drawings, where like numerals denote like elements and in which.

Like reference numerals refer to like parts throughout the several views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
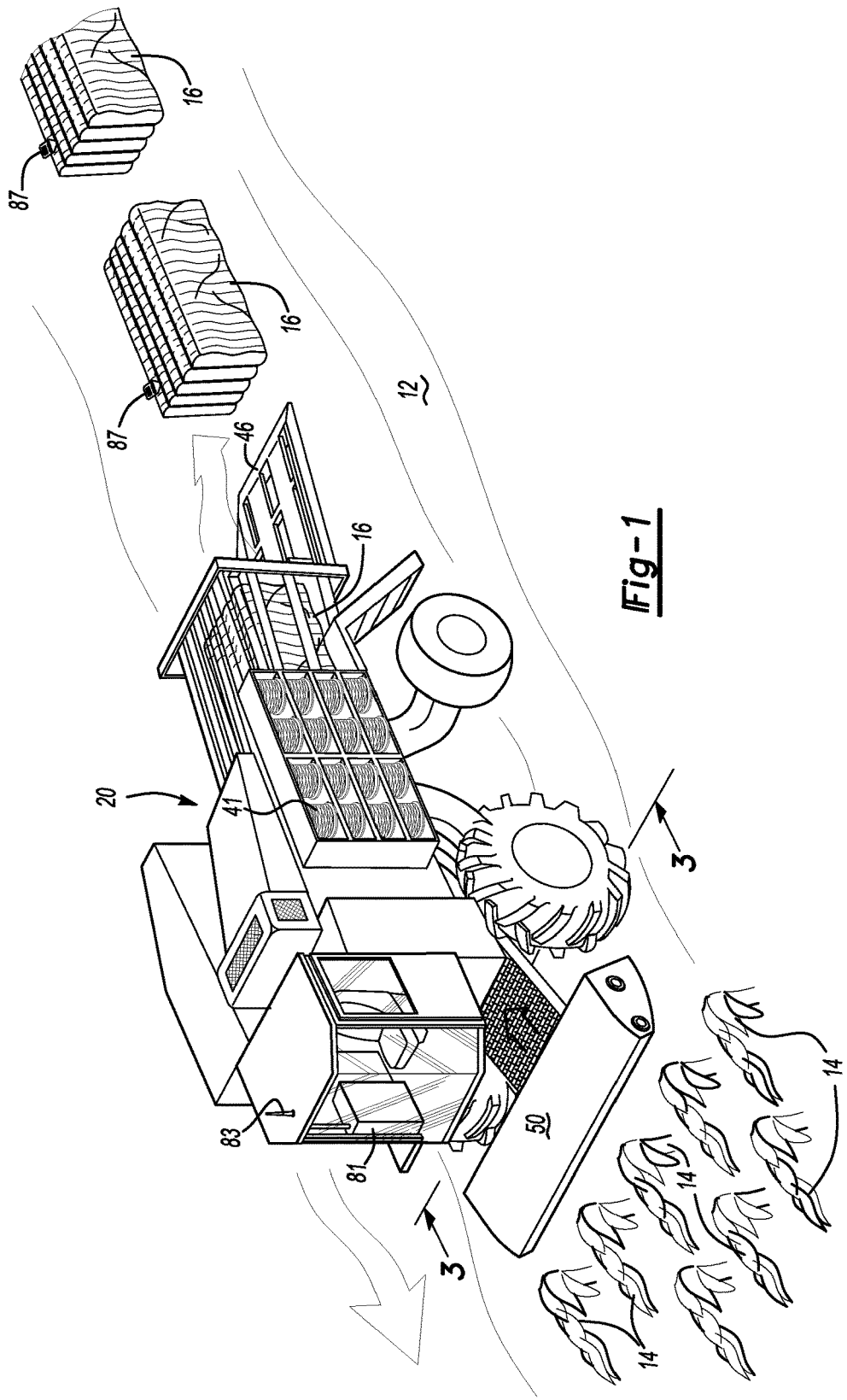
FIG. 1 presents a perspective view of a self-propelled biomass harvesting system embodying the present invention, wherein the system is harvesting agricultural crop residue in an agricultural field.

Turning to the drawings, FIG. 1 shows a biomass harvesting system 20 which is one of the preferred embodiments of the present invention and illustrates its various components. Biomass harvesting system 20 is operating in an agricultural field 12 for harvesting in a single pass manner agricultural plant growth 14, here depicted as residual corn stalks remaining after the prior grain harvesting of the corn plants, for the purpose of creating discrete biomass units 16 such as individual bales of cornstalks. While the harvesting system 20 is shown as harvesting cornstalks 14, those practiced in the art will readily recognize that the concepts embodied herein are generally applicable to all biomass harvesting systems, and that agricultural plant growth 14 can comprise plant growth produced specifically as a biomass product or alternatively, as shown, is the residue of grain based agricultural crops after harvesting the grain.

Figure 2:
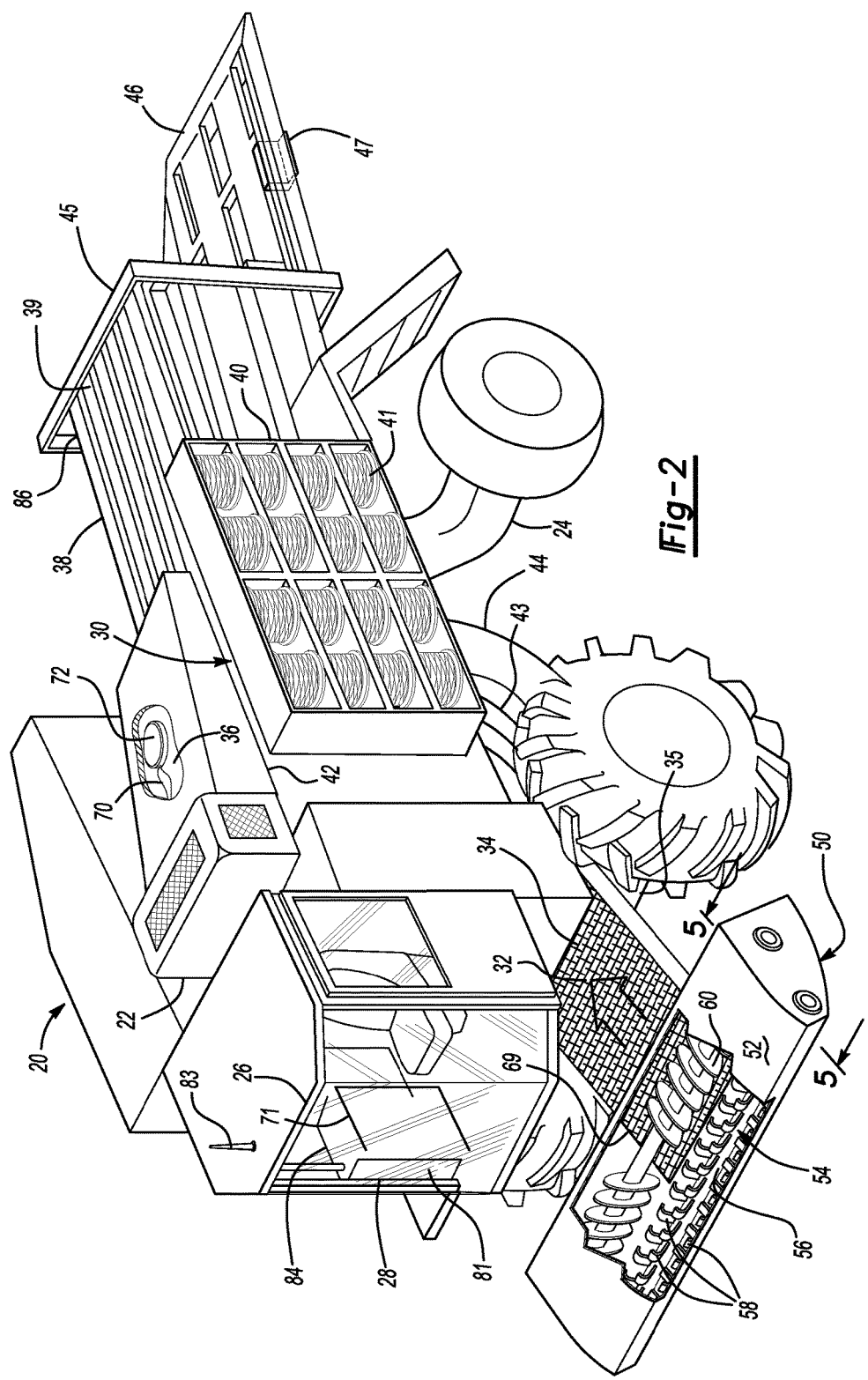
FIG. 2 presents a perspective view of a biomass harvesting system embodying the present invention.
Figure 4:
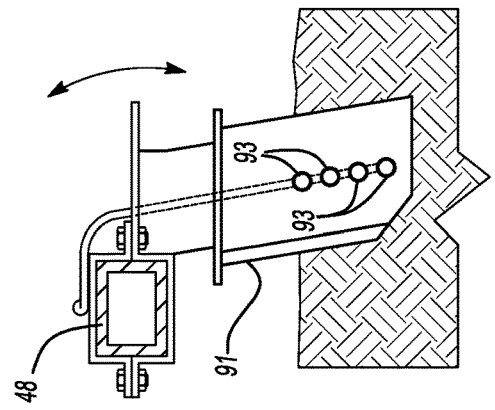
FIG. 4 presents a side elevation view of the topsoil quality analyzer engaged in the topsoil layer shown in FIG. 3, taken along the line 4-4.

Referring now to FIG. 2, biomass harvesting system 20 includes a power source such as an internal combustion engine 22 mounted on a chassis frame 24 for providing mechanical and electrical power to biomass harvesting system 20. As shown, biomass harvester 20 is a self propelled unit including an enclosed cab 26 in which an operator can sit to control the harvester 20 and monitor its various subsystems.

Also mounted on the chassis 24 is a biomass accumulator 30. Biomass accumulator 30 as shown is a baler that produces a series of discrete biomass units 16 (FIG. 1) or bales of harvested agricultural growth 14. Operation of a baler is well known in the industry and is briefly described herein for clarity. A collecting apron 32 receives a windrow of biomass for harvesting from a windrower 50 (discussed in further detail below). Collecting apron 32 delivers the windrow of harvested biomass to a pre-chopper 34 where the biomass is reduced to smaller pieces to facilitate a uniform density of the final bale of biomass. A predefined quantity of biomass is then captured by a sweep arm or conveyor 35 and delivered to a pre-compression chamber 36 where the predefined quantity of biomass is formed into an individual flake and inserted into compression chamber 38. A bale is comprised of a plurality of individual flakes compressed together in compression chamber 38. Compression chamber 38 includes adjustable sides 39 that are selectively adjustable to constrict or open the cross-sectional area of the compression chamber end 45. Adjusting sides 39 to increase constriction results in higher density bales while conversely, decreasing constriction results in lower density bales. Thus, the density of the biomass bales produced can be selectively controlled by the operator to meet specific demands. Once the series of accumulated flakes reaches a predefined volume, needles 43 travel through needle guards 44 to thread a series of twine strands through the series of accumulated flakes in compression chamber 38. In such manner, the twine strands fed from twine spools 41 in twine rack 40 completely surround the series of flakes whereupon knotting mechanism 42 securely ties ends of the twine strands in knots thereby securing the plurality of flakes together in a single bale 16. As bales 16 continue to exit from compression chamber end 45, bales 16 are temporarily supported on trailing platform 46 until completely exited from compression chamber 38 whereupon bales 16 are allowed to fall to the ground for later retrieval.

Biomass harvesting system 20 has a windrower 50 mounted at a front thereof. Windrower 50 can collect pre-cut or pre-chopped biomass from a wide swath or, as shown, comprises a housing 52 operatively retaining a chopping unit 54 for simultaneously chopping the agricultural plant growth 14 and delivering the chopped plant growth 14 to a transporter 60, here shown as an auger 62. Alternatively, transporter 60 can comprise a mesh belt (not shown). Transporter 60 accumulates the chopped plant growth from the entire swath width covered by windrower 50 and delivers the chopped plant growth to a central windrow exit 69 for discharge onto collecting apron 32. Chopping unit 54 typically comprises one or more rotating drums 56 to which are pivotally affixed a plurality of flail knives 58. Those practiced in the art will readily recognize that flail knives can conform to a plurality of design configurations known in the agricultural industry.

The biomass harvesting system 20 further includes additional subsystems for analyzing the quality of the biomass being harvested, and the condition of the agricultural field topsoil to optimize the quantity and quality of the biomass bales 16 produced thereby. Several determinations must be made by an intelligent system that analyzes the topsoil layer concurrent with the harvesting of the biomass. In such a manner, harvesting system 20 includes a central processing unit 28 that has a memory module with an executable instruction set stored therein. Central processing unit 28 executing the instruction set integrates the operation of biomass accumulator 30 and windrower 50 with subsystems such as biomass quality analyzer 70, dirt control system 63, ground cover residue monitor 76, active tracking system 81 and soil chemical analyzer 90 to maximize the biomass quality and quantity being harvested while providing agricultural field 12 with sufficient biomass residue for erosion control and nutrient replenishment.

Biomass quality analyzer 70 comprises a spectrometer 71 that receives electronic signals from a sensor head 78 positioned in proximity to the path of the biomass as the biomass transits through biomass accumulator 30. Spectrometer 71 samples via sensor head 72 the biomass throughput at predetermined time intervals. Spectrometer 71 chemically analyzes the spectral signature of the biomass entering the pre-compression chamber 36 of baler 30. This spectrometer data is analyzed to extract relevant chemical quality data of the biomass, determining such characteristics as moisture, dirt, cellulose, lignin, hemicellulose, fungal contamination and other characteristics. Individual sample signals are integrated across all of the biomass sampled and compressed into each discrete bale 16. The integrated quality data is transmitted to central processing unit 28 for further processing according to the executable instruction set.

Referring now to FIGS. 2, and 5-7, the dirt control system 63 utilizes the dirt levels sensed by biomass quality analyzer 70 to determine if the amount of dirt contained in the biomass is at an acceptable level, or if there is excessive dirt in the biomass. If the dirt level is determined to be excessive, the excess dirt and other unwanted particles must be sifted out of the biomass stream. The central processing unit 28 issues commands to perform tasks individually or in combination to adjust the speed of harvesting system 20 across agricultural field 12, to raise or lower the height of chopping unit 54 above the surface of agricultural field 12, and to adjust the rotational speed of chopping unit 54 to reduce the amount of dirt picked up by flail knives 58. Further, operational speed of transporter 60 is modifiable in response to commands from central processor 28.

Figure 5:
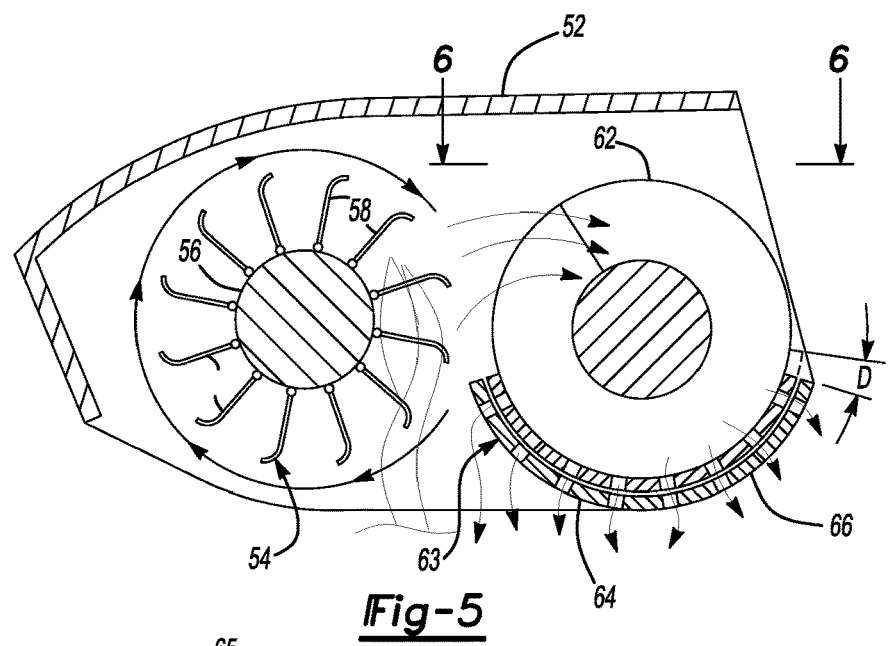
FIG. 5 presents a side elevation cross-sectional view of a representative chopping head of the biomass harvesting system shown in FIG. 2 and taken along the line 5-5.
Figure 6:
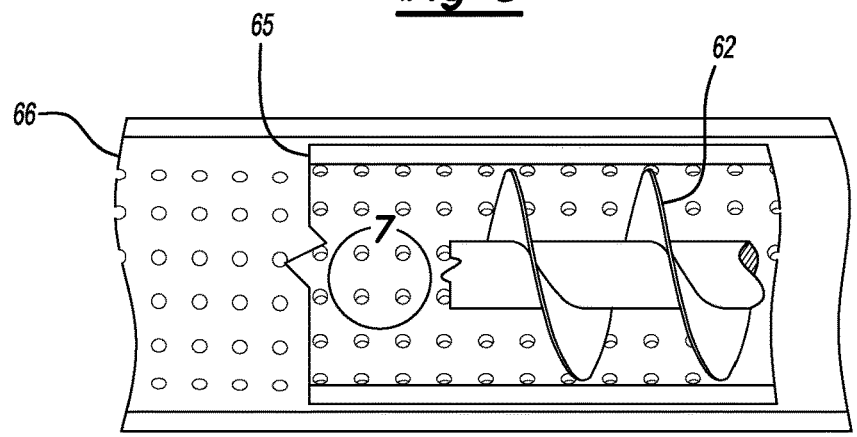
FIG. 6 presents a top view of the auger portion of the chopping head shown in FIG. 5 and taken along the line 6-6.
Figure 7:
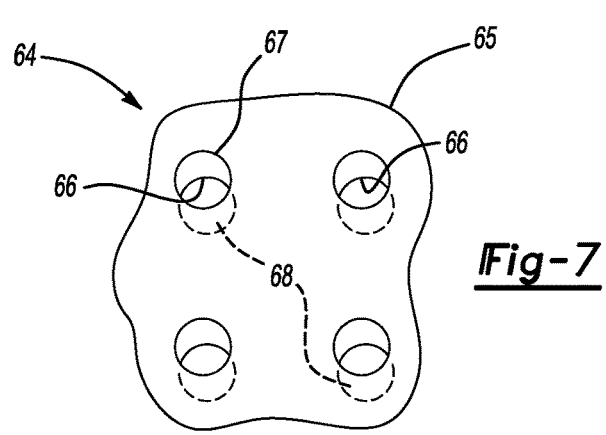
FIG. 7 presents an enlarged plan view of the slotted housing for the auger shown in FIG. 6 and denoted by the numeral 7, FIG. 6.

Transporter 60, as shown, has at least one auger 62 in a slotted housing 64 for feeding the biomass to windrow exit 69. Slotted housing 64 includes first and second arcuate housing members 65, 66 wherein first arcuate housing member 65 is nested within second arcuate housing member 66. Each housing member 65, 66 defines a plurality of slots 67, 68 respectively or apertures in a lower portion thereof in a predefined and substantially identical pattern such that translation of first housing member 65 with respect to second housing member 66 will vary the final slot size for allowing dirt and particulate materials to be sifted out of the biomass being transported therealong. Such translation is represented in FIG. 5 by angular displacement 'D.'

When quality sensor 72 detects an excess of dirt or unwanted particulates in the biomass, the excess dirt signal is transmitted to central processing unit 28, and in response thereto central processing unit 28 commands slotted housing 64 to adjust the alignment of slots 67, 68 to enlarge the slot openings and thereby increase the sifting out of unwanted dirt and particulates. Alternatively, transport 60 can comprise a mesh belt of variable composition which allows dirt to fall through (not shown). Further dirt control system can be augmented by an air stream (not shown) with adjustable volume and pressure controls for directing air over and through the biomass to assist in dirt and fine particulate removal.

Figure 3:
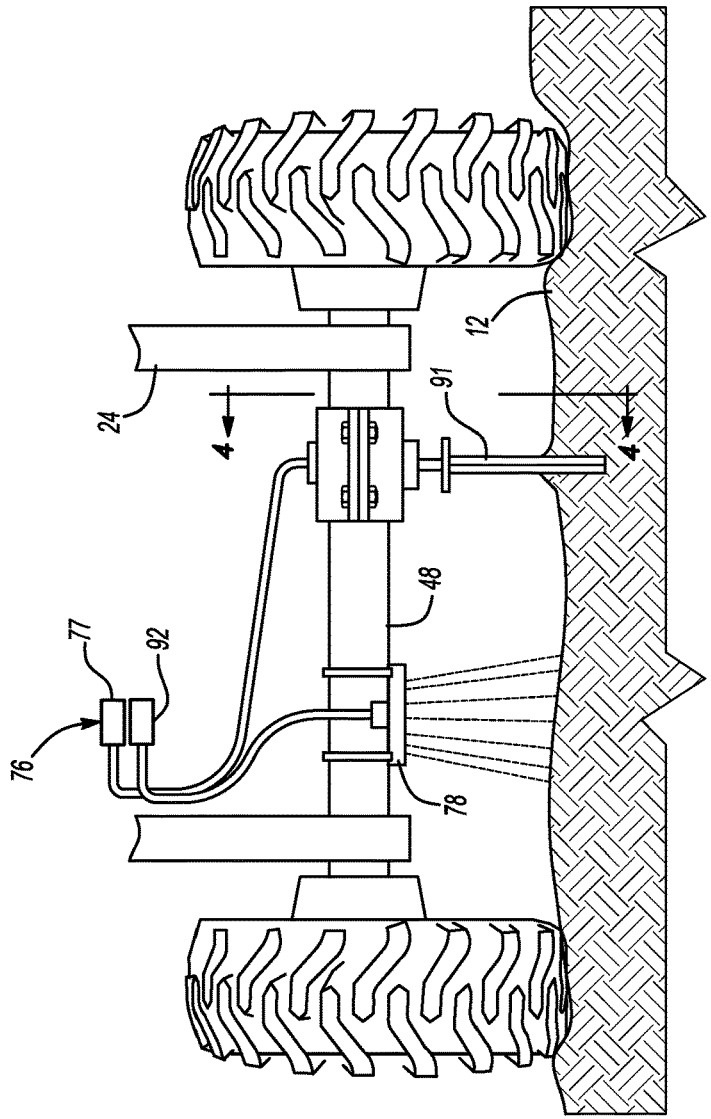
FIG. 3 presents a cross-sectional view of the lower portion of the harvesting system shown in FIGS. 1 and 2, taken along the line 3-3, FIG. 1 and illustrating the positioning of topsoil analysis sensors.

As illustrated in FIGS. 2 and 3, harvesting system 20 also includes a ground cover residue monitor system 76 comprising an analyzer 77 and an associated sensor head 78 mounted on sensor bar 48 positioned behind windrower 50. Ground cover residue monitor system 76 can be either a spectroscopy based system or an imaging analysis base system. In use, sensor head 78 scans the surface of agricultural field 12 during operation of harvesting system 20 and transmits associated electrical signals to analyzer 77 for determination of the quantity of agricultural plant growth 14 remaining on the surface of agricultural field 12. The quantity data in turn is transmitted to central processing unit 28 which in response to the executed instruction set determines the desired quantity of agricultural plant growth 14 to remain on the surface of agricultural field 12 for proper nutrient retention and erosion control. If central processing unit 28 determines the amount of agricultural plant growth 14 to be left on field 12 requires modification, associated control signals are transmitted to windrower 50 to increase or decrease the size of the slots in slotted housing 64 and, in combination therewith or independently therefrom, to raise or lower chopping unit with respect to the surface of agricultural field 12.

A soil chemical analyzer 90 can also be integrated with biomass harvesting system 20. Soil chemical analyzer 90 typically comprises a spectrometer 92 and at least one sensor head 93 embedded within a soil penetration element 91. Soil penetration element 91 is mounted to sensor bar 48 and includes provisions for being selectively movable between a first position raised above the surface of agricultural field 12 and a second position wherein the soil penetration element 91 is engaged within the topsoil layer of agricultural field 12. Typically, soil penetration element 91 is a knife-edged blade that penetrates from one to six inches below ground surface. Sensor head 93 is embedded in a side of element 91 such that periodic samples of the topsoil chemical composition can be sensed as sensor head 93 passes the soil at a predetermined depth. A vertical chemical profile of the topsoil layer can be obtained by embedding a plurality of sensor heads 93 in a vertically spaced arrangement in soil penetration element 91. Each sensor head 93 is associated with a compatible spectrum analyzer 92 and samples the chemical composition at its predetermined depth. The resulting chemical composition data is transmitted to central processing unit 28 for compilation into a spatial map of the chemical composition of agricultural field 12. Further, the derived chemical composition data can be utilized by central processing unit 28 to aid in determining the quantity of agricultural plant growth 14 to remain on agricultural field 12 after harvesting of the biomass. Excess removal of agricultural plant growth costs the producer by requiring alternative costly means of replacing nutrients.

Harvesting system 20 would also ideally be tied into an active tracking system 81 that provides location specific geographic information such as a global positioning system. Global positioning system includes a GPS antenna 83 mounted on harvesting system 20 and interconnected with GPS receiver 84 which is also integrated with central processing unit 28. As an alternative, tracking devices can be affixed to individual bales 16 by utilizing a radio frequency identification (RFID) system 86 that attaches an RFID tag 87 to each biomass bale 16. In operation, and with utilization of a GPS system in operable association with central processing unit 28, an identification file for an individual bale 16 is created wherein the identification file includes geographical location and quality characteristics of the bale 16. In addition, trailing platform 46 can also include a weight sensor 47 that is typically strain gauge based for determining the weight of individual bales 16 for inclusion in the data file for each bale 16. The bale 16 location is later recalled when the bale is collected and is thus positionally tracked throughout its handling. Alternatively, when an RFID system 86 is incorporated in operable association with central processing unit 28, an identification file is created for an individual bale 16 of accumulated biomass. The identification file includes quality characteristics of individual bale 16 and the identification file is transferred to a radio frequency identification tag 87 for attachment to bale 16 upon creation thereof. In such manner and as long as tag 87 is attached to bale 16, the individual unique quality characteristics of each bale 16 are readily available by electronically reading the identification file stored thereon.

The location specific geographic information system is important because it allows biomass units to be aggregated, stored, transported and processed in a non-linear manner. For example, discrete biomass units such as bales 16 harvested with elevated moisture content and hence susceptible to uncontrolled decay can be aggregated and preferentially processed while ambient environmental conditions are cold enough to inhibit spoilage.

Figure 8:
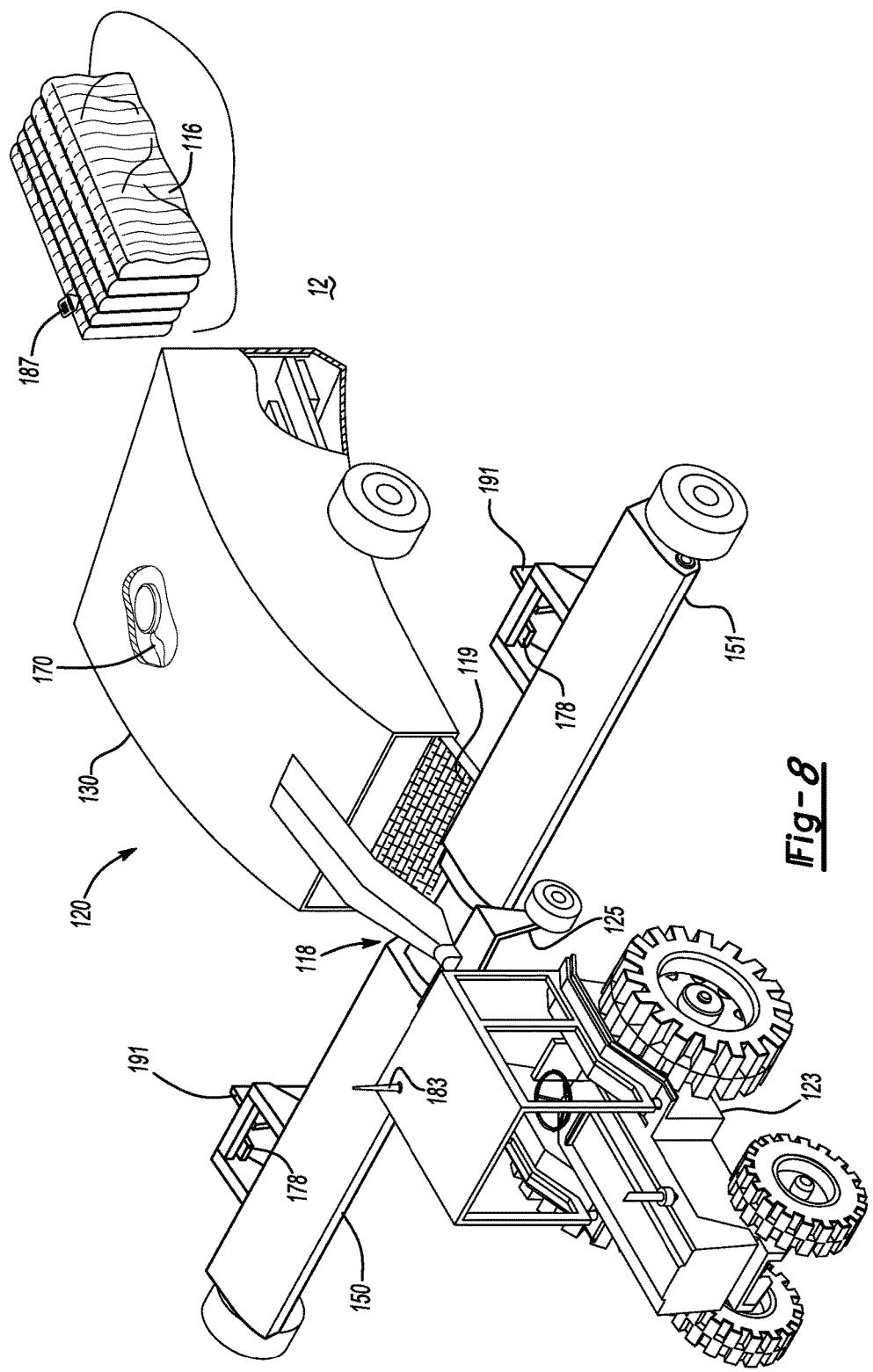
FIG. 8 presents a perspective view of a modular biomass harvesting system pulled by an agricultural tractor and embodying the present invention, wherein the system is harvesting agricultural crop residue in an agricultural field.

FIG. 8 illustrates an alternate embodiment of a modular biomass harvesting system 120. Modular system 120 includes a tractor 123 for providing mechanical and electrical power to harvesting system 120. A toolbar 125 is attached to tractor 123 and in turn at least one windrower 150 and alternatively a second windrower 151 are attached to toolbar 125 for being drawn through an agricultural field 12. Windrowers 150, 151 operate in a similar manner with similar features as windrower 50 as described above. One or both windrowers 150, 151 have mounted to a rear portion thereof a ground cover residue monitor sensor head 178 and a soil chemical analyzer 190 that operate in similar manner as ground cover residue monitor sensor head 78 and soil chemical analyzer 90 for harvesting system 20 as described above. A biomass accumulator 130 is also attached to toolbar 125 and is positioned to trail behind windrowers 150 and 151 in such a manner to simultaneously gather the biomass streams 118 and 119 from windrowers 150 and 151 respectively. Biomass accumulator 130 is typically a baler that is of a standard and known design for producing bales 116. Baler 130 also has associated therewith a biomass quality analyzer 170 for sensing quality characteristics of the biomass transiting baler 130. System 120 also includes an active tracking system for attaching RFID tags 187 and for geographical positioning utilizing a GPS system as evidence by GPS antenna 183 on tractor 123. A central processing unit (not shown) integrates all sensor subsystems and can be located in tractor 123 or another convenient location on modular harvesting system 120.

In use, and referring again to biomass harvesting system 20, system 20 is utilized for harvesting agricultural plant growth 14 from agricultural fields 12. Initially, the agricultural plant growth 14 is chopped with a chopper unit 54 of a windrower 50 during repeated passes over the agricultural field and windrowing the chopped agricultural plant growth 14 with windrower 50 for feeding into biomass accumulator 30. The chopped and windrowed agricultural plant growth 14 is then scanned with a biomass quality analyzer 70 to determine the quality characteristic of the biomass. The ground surface is further scanned with a ground cover residue monitor 76 to determine the quantity of ground cover residue remaining on the agricultural field 12 after windrowing. The chopping unit 54 of the windrower 50 is adjusted to regulate at least one quality characteristic of the biomass such as the dirt content as sensed by biomass quality analyzer 70 and to further regulate, as a function of the sensed ground cover residue quantity, a revised quantity of ground cover residue to remain on the agricultural field 12 after windrowing. The windrowed agricultural plant growth 14 is accumulated into a discrete biomass unit such as a bale 16 whereupon an identification file with an active tracking system 81 is created for individual ones of the bales 16. The identification file includes quality characteristics of bale 16. The identification file is then associated with bale 16 by either attaching an RFID tag 87 or assigning a GPS geographic identifier with the bale 16 for later recovery. A soil chemical analyzer 90 can further be used to pass a soil penetration element 91 having sensors 93 embedded therein through the topsoil layer of the agricultural field 12 to determine the vertical chemical profile of the topsoil and further utilizing this chemical data to partially determine the proper adjustment of the windrower 50.

The collection, analysis and integration of biomass composition, soil surface residue and soil chemical analysis in real-time is important as is the use of real-time quality information in biomass harvesting and marketing. As utilized in the descriptions herein, real-time data refers to quality characteristics of the collected biomass at the time it is collected and with reference to the specific location on the agricultural field from which it is collected in order to assign a quality rating or quality index to a discrete biomass unit 16. Further, reference to real-time soil chemical analysis refers to the sensed chemical analysis at the specific geographical location of the field within set area parameters defined by the instruction set executed by central processing unit 28. The user can predefine within the instruction set executed by central processing unit 28 the particular soil chemical characteristics desired to be maintained in the agricultural field 12 from which the biomass 14 is being harvested. The user can also predefine within the instruction set executed by central processing unit 28 the ranges of specific parameters relating to quality levels of the harvested biomass 14 to quantifiably give each biomass unit 16 a quality rating or quality index. The quality ratings can also conform to uniform standards predetermined by a government agency such as the U.S. Department of Agriculture (USDA).

Residual soil surface residue levels define maximum allowable biomass harvest rates since surface residue levels directly affect the potential for wind erosion and water erosion. There is significant spatial variability in above surface biomass residue which requires real-time analysis. In general, biomass residue levels are related to grain yield which also exhibits significant spatial variability. To maximize biomass harvest while meeting surface residue needs, the percentage of biomass harvested has to be continually adjusted in real-time. Indeed, USDA (the regulatory agency for this parameter) is not interested in average levels across a field but insuring that minimum levels are met at all locations within the field.

Acceptable harvest rates of biomass 14 may be influenced by near-surface root mat density which may be determined in real-time by soil chemical analysis utilizing soil chemical analyzer 90. A good example of this effect may be the harvest of biomass from a plant species (grass) whose roots form a "sod" layer at the soil surface.

Acceptable harvest rates of biomass 14 may also be influenced by soil chemical composition which may exhibit extreme spatial variation across a field. A portion of the surface biomass residue resulting from the production of an agricultural crop may be (depending upon tillage practices, the local environment, soil insect/worms, etc.) incorporated into the soil profile through natural and/or agricultural practices. If organic matter in the soil is below a desired level, it may be desirable to leave additional biomass residue on the soil surface. Similarly, if the surface biomass residue is high in a specific nutrient which the soil is deficient in, it may be desirable to increase the unharvested fraction of surface biomass residue.

The kind and quantity of organic matter in the soil is important. Typical fractions may be lignin, cellulose and hemi-cellulose. These components are the building blocks of any plant's cell walls. However, soil is actually a complex ecological environment with hundreds of thousands of different species of microbes (aerobic, anaerobic and facultative) archaea, insects, mites, etc. These represent the living organic matrix of the soil. In addition, soil includes other discreet components such as humus and biochar. The levels of all of the above can be used to define a minimum and optimum level of unharvested biomass 14 to remain on the surface of the agricultural field 12.

At the same time, there can easily be too much surface residue left on a field. Farmers have fought this issue for millennia through surface tillage and/or the routine burning of surface biomass residues. High soil surface residue levels result in reduced soil drying which is frequently required for the conduct of routine agricultural production activities such as: High soil moisture levels and low soil oxygen levels which may promote the development of crop diseases, insect infestations; Cool soil temperatures which inhibit seed germination, etc. Surface tillage can be undesirable because tillage operations generally destroy soil texture/tilth, promote the oxidation of organic matter through the introduction of excess oxygen, etc. Hence, the goal is to remove the optimum amount of surface residue 14 to further optimize the chemical composition and environmental characteristics of agricultural field 12.

The chemical composition of the soil in agricultural field 12 is important because all plants require nutrients for growth, and inadequate supplies of essential nutrients result in reduced plant productivity (grain, biomass, etc.). However, providing excess water soluble nutrients can result in those nutrients entering the water supply and creating an environmental problem (such as hypoxia in the Chesapeake Bay, Gulf of Mexico, etc.). If a specific soil nutrient level is high or excessive, and the crop residue is also high in that nutrient, it may be desirable to increase the removal rate of biomass 14.

At the same time, different soil fractions may have the ability to reversibly bind specific soil nutrients keeping them out of the water supply while allowing plants to access that nutrient for growth. Examples might include biochar, humus, etc. Therefore, this data is important in defining minimum, maximum, or optimum removal rates of biomass 14 from agricultural field 12.

Knowledge of the chemical composition of the biomass 14 being harvested is also important. When many agricultural crops dry down at maturity, the moisture level in various parts of the plant may vary dramatically. For example, in maize, the grain may have 15 percent moisture early in the harvest season but the stalk may have 60% moisture. Later in the harvesting season, both fractions may be 15%.

Biomass 14 such as maize fodder baled at 60% moisture is fundamentally different than fodder baled at 15%. At 60% moisture, uncontrolled microbiological decay starts almost immediately unless controlled by cold storage conditions, by the addition of chemical preservatives, by the addition of biological preservatives, or by immediate secondary drying processes. Handling fodder with 60% moisture may also require different equipment, approaches, etc.

If the process for utilizing harvested biomass 14 requires particle reduction (i.e., grinding, etc.), knowledge of the moisture levels is critical to the physical process of particle size reduction. A requirement to reduce the particle size of biomass 14 used in a specific application may require the additional step of physically drying the biomass prior to processing. This can be expensive, due to energy costs and the need for additional specialized processing equipment, and also a technically difficult process.

Different utilization technology needs for biomass 14 can be optimized for different kinds of biomass and for biomass with different chemical compositions. For example, these utilization technologies can include gasification, fast pyrolysis, papermaking, co-firing combustion, fermentation, etc. Many fermentation systems focus exclusively on utilization of the cellulose fraction. Therefore, segregating biomass collection units 16 (such as bales) of a given type (maize stalks) with high levels of cellulose from those with low levels of cellulose provides numerous benefits. The producer can segregate bales to enable value-added opportunities and sell bales based upon cellulose content. The processor can optimize process design or operation to increase product yield and reduce product cost. Studies have shown that if one was producing ethanol from maize stalks, a dry ton of high cellulose biomass would yield 30% more ethanol than a dry ton of low cellulose biomass and reduce the cost per gallon by a similar amount.

The above factors are functions of the chemical composition of the agricultural field soil 12 and quality characteristics of the harvested biomass 14 which, in turn, are sensed and biomass quality analyzer 70, dirt control system 63, ground cover residue monitor 76, and soil chemical analyzer 90 in conjunction with geographical field positioning as one of the functions of active tracking system 81. The sensed data points are then transmitted by these sensors to central processing unit 28 which, through execution of the stored instruction set, integrates the sensed data points to determine the quality index of the accumulated biomass units 16 and the quantity of biomass to be harvested from or to remain on the agricultural field 12 in real time. Those practiced in the art will recognize that this system can function with multiple-pass harvesting systems as well as single-pass harvesting systems utilizing positional data from active tracking system 81.

Figure 9:
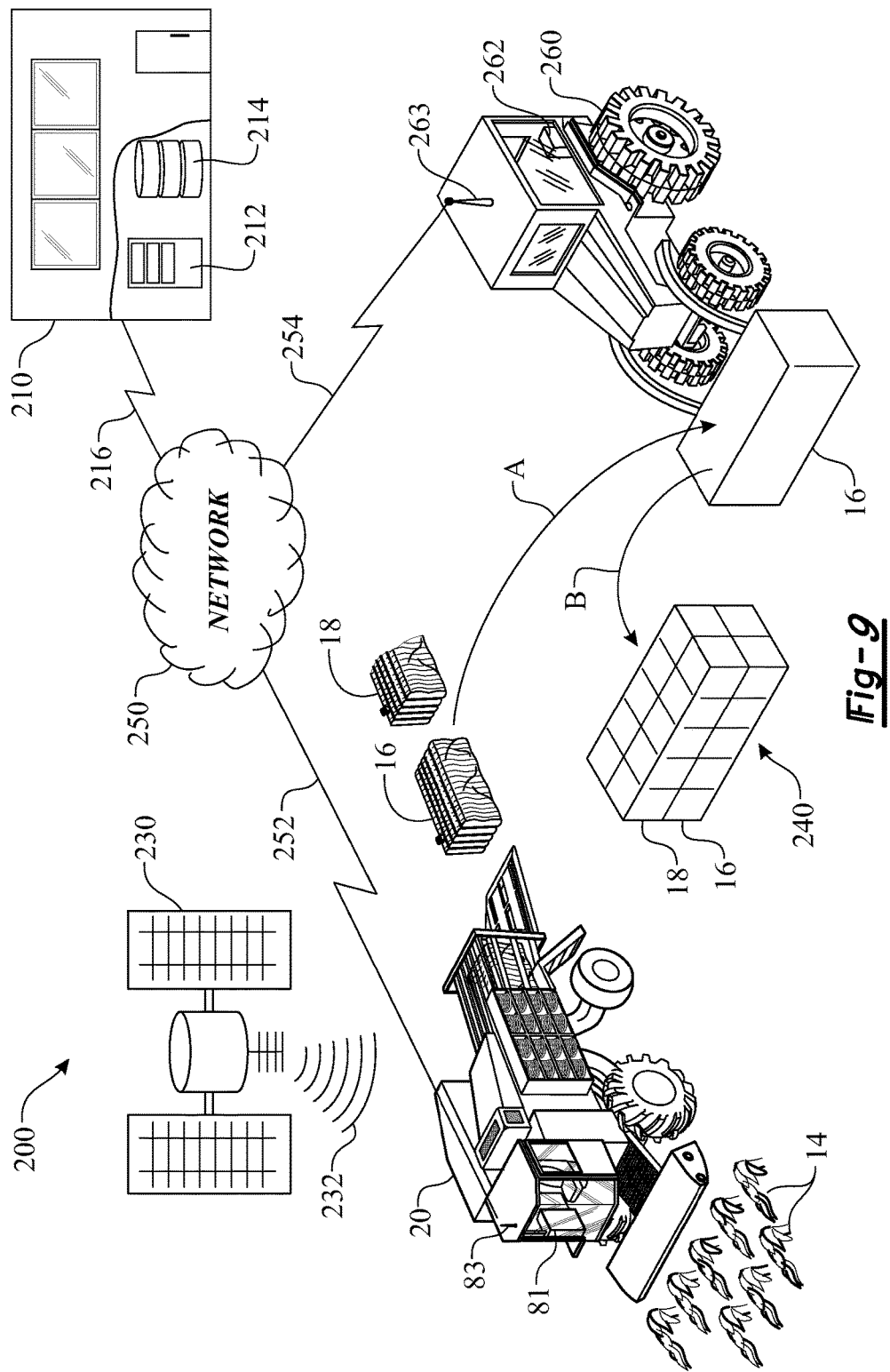
FIG. 9 presents a representative schematic of the harvested biomass bales being arranged in a temporary stack for later transport.
Figure 10:
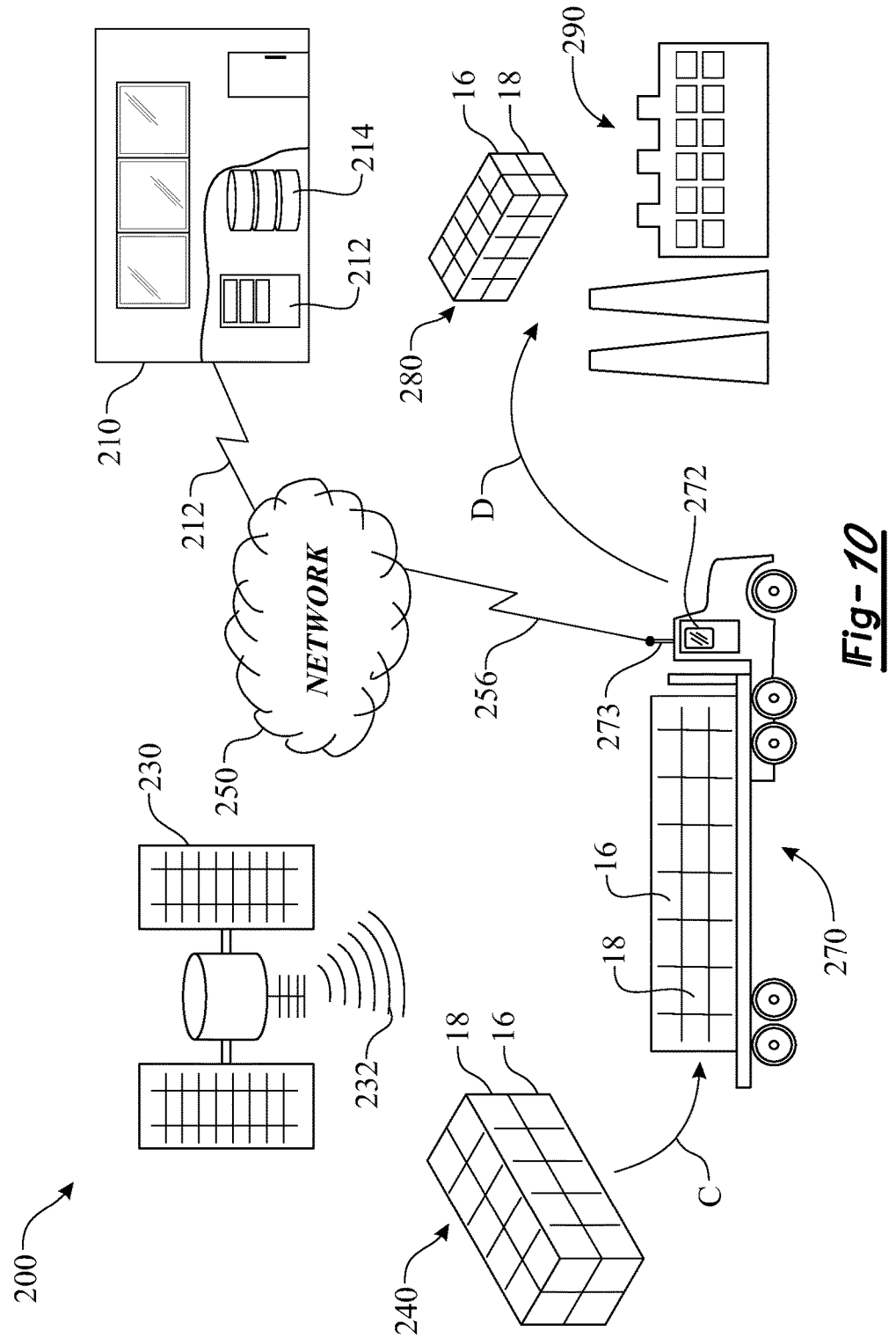
FIG. 10 presents a representative schematic of the harvested biomass bales being transported from the temporary stack of FIG. 9 to a final processing site.
Figure 11:
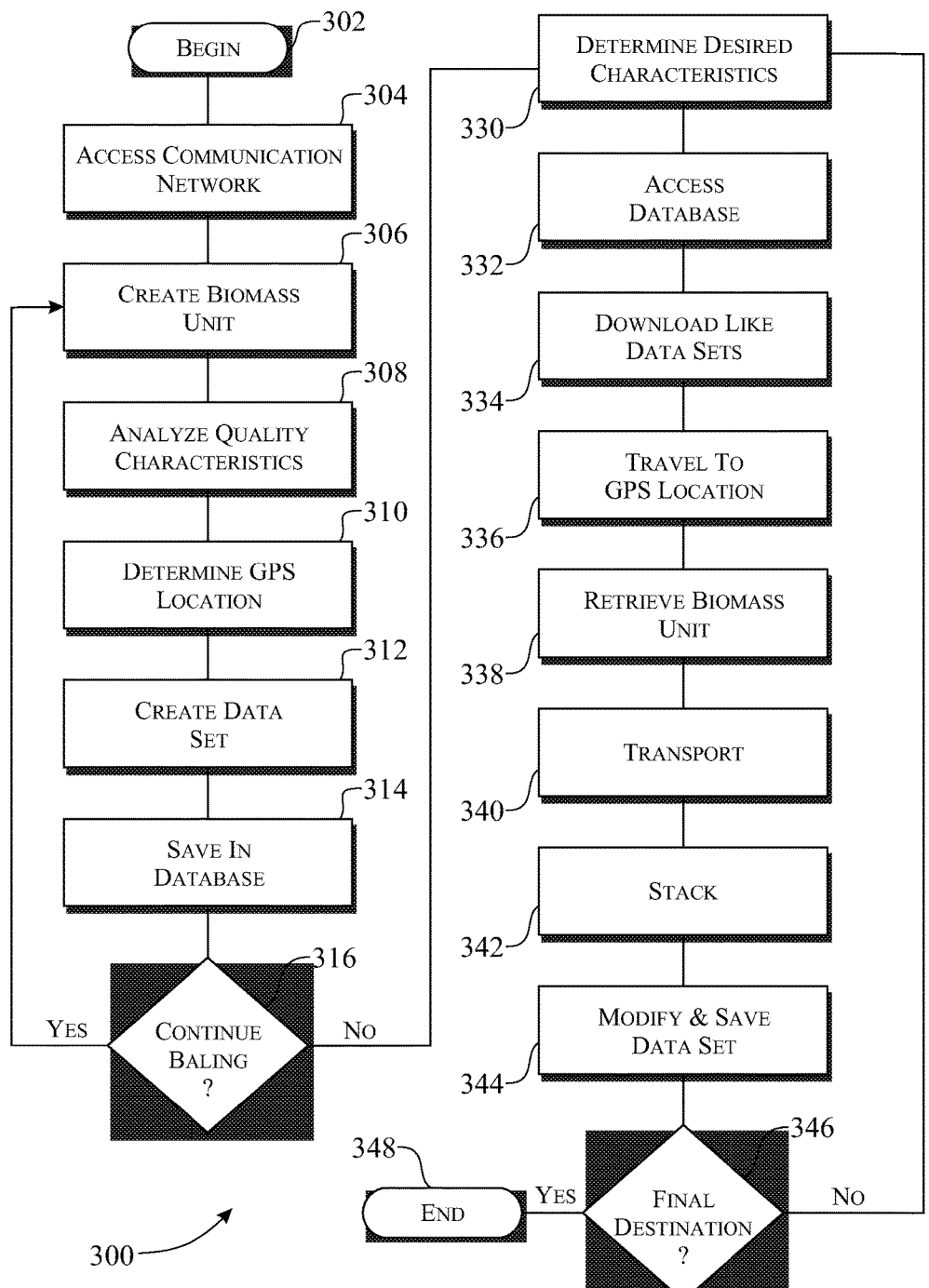
FIG. 11 presents a block diagram of the process for GPS tracking of the biomass bales.

As previously referenced, a global positioning system (GPS) can be utilized for tracking the biomass units created by the harvesting system 20. Referring now to FIGS. 9-11 a system and method for tracking biomass units relying strictly on GPS without the use of identifying reference tags on the individual biomass units, such as bales, is illustrated. As illustrated in FIGS. 9-10, a system 200 for tracking accumulated units of biomass according to quality characteristics of the biomass units includes a biomass harvester 20 which includes a central processing unit 81 and further includes an antenna 83 for wireless electronic communication purposes. The harvester 20 includes a biomass quality analyzer 70 for determining quality characteristics of the harvested biomass as described above. The system 200 further includes a global positioning system receiver and associated antenna (not shown, but of known configuration within the industry) has the capability of receiving positioning signals 232 from a plurality of global positioning satellites 230 for accurately determining a geographic position of the harvester 20. Those practiced in the art will also recognize that the GPS systems referenced herein can also provide heading orientation for the vehicle in which the GPS system is integrated with the inclusion of several different sensing systems frequently bundled with the GPS system (magnetic sensors, inertial sensors, dual GPS antennae communicative with the GPS receiver, etc.) and also known in the art. The central processing unit 81 is communicative via a wireless electronic link 252 with an outside network 250 such as the Internet.

An operational base 210 includes a base computer 212 and a searchable memory module 214 communicative with the base computer 212. The base computer 212 is also communicative with the network 250 via an electronic link 216. The searchable memory module 214 includes an executable instruction set thereon for execution by the base computer 212. The executable instruction set is functional to record and store data sets associated with individual biomass units 16, 18 produced when the biomass harvester 20 converts unharvested biomass 14 into individual biomass units 16, 18. Alternatively, the central processing unit 81 of the harvester 20 can also function as the base computer 212 for storing the data sets associated with individual biomass units in lieu of a dedicated facility 210, computer 212, and memory storage module 214. In this configuration, the central processor 81 of harvester 20 can communicate either directly or via network 250 with the central processor 262 of the bale stacker 260 described below.

A biomass unit transporter such as a bale stacker 260 also includes a central processing unit 262 with an antenna 263 for electronic communication with network 250 via electronic link 254. The bale stacker 260 further includes (not shown for sake of clarity) a GPS receiver and antenna of a known configuration within the industry and having the capability of receiving positioning signals 232 from the plurality of global positioning satellites 230 for accurately determining a three-dimensional geographic position of the bale stacker 260. The GPS receiver is integrated with central processing unit 262 in a manner such that the central processing unit 262 receives the biomass unit data sets from the base computer 212, directs the bale stacker 262 the desired biomass unit 16, 18. Bale stacker 260 is capable of collecting or accumulating individual biomass units 16, 18 (as indicated by arrow A) and then transporting the biomass units 16, 18 to a new location (arrow B) and creating a mini stack 240 of harvested biomass units and the three-dimensional GPS coordinates of the individual biomass units 16, 18 within the mini stack 240. Once the biomass units 16, 18 have been placed in the mini stack 240, the corresponding data sets with respect to the biomass units 16, 18 are modified to reflect the three-dimensional GPS coordinates for the respective biomass unit 16, 18 and retransmitted to the base computer 212 via the network 250 and electronic link 254.

As further illustrated in FIG. 10, the mini stack 240 of biomass units including biomass units 16, 18 can then be accessed by a second biomass unit transporter such as a semi-truck 270 onto which biomass units from the mini stack including biomass units 16, 18 are loaded (arrow C). The semi-truck 270 also includes a central processing unit 272 which is communicative with the network 250 via wireless electronic link 256. The semi-truck 270 further includes (not shown) a global positioning system receiver having the capability of receiving positioning signals 232 from the plurality of global positioning satellites 230 for accurately determining a geographic position of the semi-truck 270 and a three-dimensional geographic position of the individual biomass units 16, 18 on the semi-truck 270. Again, the data sets associated with the individual biomass units 16, 18 are modified to reflect the new location of the biomass unit 16, 18. The semi-truck 270 transports its load of biomass units including biomass unit 16, 18 to a biomass unit stack 280 at a processing plant 29 (arrow D) for conversion thereof into a finished product by processing plant 290. The processing plant 290 may also have a computer (not shown) which is communicative with the network 250 or alternatively directly communicative with the central processor 272 of the semi-truck 270 for receiving the data sets of the individual biomass units 16, 18 including three-dimensional GPS coordinates of the individual biomass units 16, 18 when unloaded from the semi-truck 270 for later retrieval and processing.

The above-described tracking system 200, in use, functions to track identified biomass units such as biomass units 16, 18 in the tracking process 300 as shown in FIG. 11. The process begins at block 302 and in block 304 the central processor 81 of the biomass harvester 20 accesses the communications network 254 communication with the base computer 212. In block 306 the biomass harvester begins creating biomass units such as units 16, 18. As the biomass 14 is being harvested, the quality analyzer 70 analyzes the biomass for quality characteristics of at least one of the group consisting of moisture content, dirt, cellulose, lignin, hemicellulose, and fungal contamination and preferably for a plurality of quality characteristics. Concurrently, in block 310, the biomass harvester 20 utilizing the GPS receiver determines a unique location where the specific biomass unit 16 so analyzed has been deposited on the field. This location can be a unique location of a specific biomass unit 16 or alternatively can include all biomass units 16, 18 within a specific area bounded by three or more GPS coordinates. The combination of the quality characteristics and the GPS location data are combined to create a data set for that biomass unit in block 312, and in block 314 the data set is saved in a database by either immediate transmission to base computer 212 over network 250 or saved by central processor 81 for later transmission. In block 316 a determination is made whether to continue baling further biomass units. If further biomass units are to be baled, then the process returns to block 306 and the process represented by blocks 306-314 is repeated for additional biomass units.

Those practiced in the art will readily recognize that, although not shown, the biomass harvester 20 can, instead of depositing biomass units directly on the ground, utilize a bale accumulator at the rear of the biomass harvester 20. The biomass harvester discharges the individual biomass units 16, 18, or bales, onto the bale accumulator. In turn, the bale accumulator receives the individual biomass units 16, 18 discharged by the biomass harvester 20 and either deposits the biomass units directly onto the ground or aggregates them into units of two, three, or more depending upon the accumulator capacity and then deposits the aggregated units onto the ground in a desired array. This aggregation permits the operator to move bales toward the end of the field where a temporary stack is located thereby increasing the operational efficiency for the bale stacker 260. In addition, enabling the bale stacker 260 to pick up two or more bales at a single location in the field also increases efficiency. Operational efficiency is further enhanced because the bale accumulator can be designed to rotate bales discharged by the biomass harvester 20 and prior to the accumulator depositing the bale array on the ground in a three-dimensional position designed to meet the needs of the bale stacker 260. For example, the bales can be oriented parallel to the row, perpendicular to the row, etc. to minimize unnecessary maneuvering of the bale stacker 260.

If continued baling of the biomass is not desired, the process then proceeds to block 330 to determine which quality characteristics determined in block 308 are desired for a grouping of bales to be accumulated. Those practiced in the art will readily understand that baling of the biomass can continue in parallel with accumulation of the biomass units and is shown herein in serial fashion for the sake of clarity. Once a determination has been made in block 330 of which desired quality characteristics are to be grouped together, the database is accessed in block 332 and data sets for biomass units possessing those quality characteristics are downloaded in block 334 to the central processor 262 of bale stacker 260. In block 338, the bale stacker 260 utilizing its GPS receiver travels to the GPS coordinates of a desired biomass unit 16, 18 and retrieves that biomass unit. The biomass unit is then transported to a new location in block 340 and is stacked in a mini-stack with other biomass units of like quality characteristics in block 342. Further, two or more mini-stacks can be combined to create a main stack for storage efficiency, and the three-dimensional GPS location of the biomass units within the main stack can also be determined. Those practiced in the art will readily recognize that the bale stacker 260 may be of sufficient capacity to retrieve a plurality of biomass units and transport the plurality of units at the same time. In block 344 the data sets of the individual biomass units 16, 18 are modified to reflect a new three-dimensional GPS location and re-saved in the database. If this is the final destination as determined in block 346, the process ends in block 348.

However, if the accumulated biomass units are desired to again be relocated the process returns to block 330 and the steps of blocks 330-344 are then repeated for a new location. One such relocation process can include returning to block 330 to determine which biomass units possess a desired characteristic for further transport. In block 332 the database is accessed and the data sets of the desired biomass units are downloaded in block 334 and referenced to the mini stack 240. An over the road transport 270 is directed to the mini stack 240 in block 336. The biomass units are retrieved from the mini stack 240 in block 338 and placed on these semi-truck 270 in block 340 on which they are stacked in block 342. The three-dimensional position of individual biomass units within the stack on the semi-truck 270 are annotated to the data sets for those biomass units and again saved in the database in block 344. The process of blocks 330-344 can continually be repeated for each movement of the biomass units until the biomass units reach a final processing destination a processing facility 290. Once at the final processing plant, the bales of biomass are systematically off-loaded from the semi-truck 270 into a pre-process line. This permits the location of a specific bale on the pre-process line to be linked to the location of the biomass unit on the over the road transporter such as the semi-truck 270. The semi-truck 270 then returns for another load of bales and the appropriate portions of the process 300 are repeated.

The design and operation of the software instruction set utilized for tracking of the biomass units is simplified if the biomass unit stacking vehicle always creates standardized units of bales to be stacked (for example eight bales in a 2×4 horizontal array), the storage stack is constructed in a standardized manner (for example, from a series of eight bale sub-units inverted into a 2×4 vertical array), the over the road transporter removes bales from a stack in a standardized manner and the over the road transporter is off-loaded in a standardized manner. However, standardization is not an inherent requirement. A simple data system interface such as a touch screen, keypad, optical imaging system, etc. can easily allow an operator to off-load a stack or a load from an over the road transporter 270 in a controlled manner so as to maintain tracking continuity.

Figure 12:
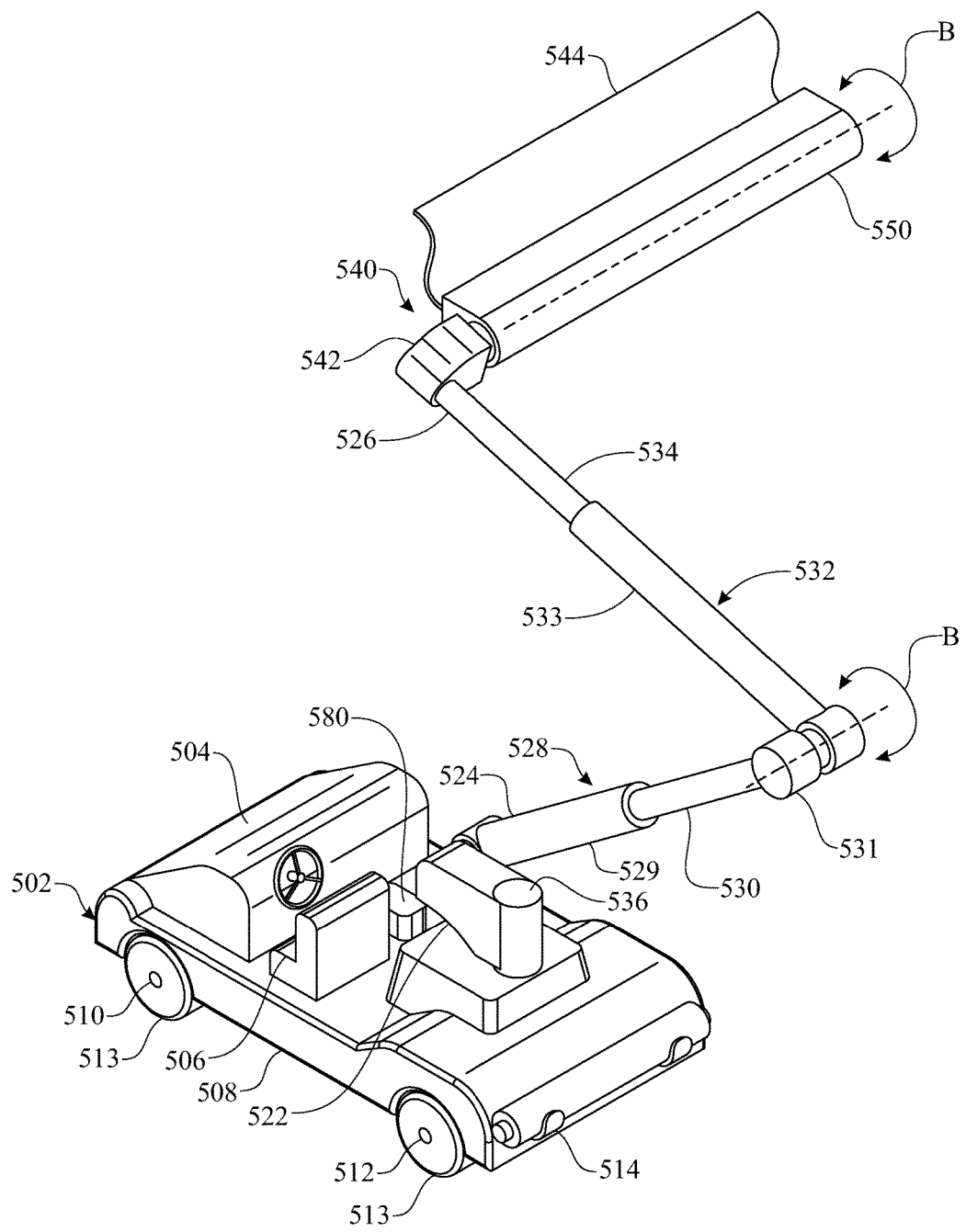
FIG. 12 presents a top isometric view of a biomass stack covering system, embodying the present invention having a tarpaulin dispensing apparatus at a free end of an articulated arm.

For longer-term storage, mini-stacks can be combined to create one or more main stacks 590 comprised of individual bales 592 (FIG. 13) and located either in the field where the biomass is harvested or at an alternate location such as a processing facility. These stacks, in turn, require covering to protect the individual bales making up the stacks from the elements and weather. Referring now to FIGS. 12-17, a biomass stack covering system 500 is illustrated in FIG. 12 and includes a motorized vehicle 502 supporting an articulated arm 520 having a proximal end 524 attached to the vehicle 502 and also including a tarpaulin dispensing apparatus 540 attached to a distal end 526 for applying a tarpaulin sheet 518 to the biomass stack 590.

For purposes of this disclosure, the term "biodegradable" as utilized herein, is defined to mean that the material described as "biodegradable" doesn't hurt equipment, is biologically degradable in a composting environment, and will pass through equipment used to pre-process biomass prior to passing through processing equipment specific to a biomass utilization process in a way similar to the biomass being processed. The items constructed of a "biodegradable" material will not be harmful to the process or equipment employed in a biorefinery for the purpose of processing biomass.

The motorized vehicle 502 comprises a chassis 508 supported by wheels 513 rotationally affixed to a front axle 510 and a rear axle 512. The vehicle 502 is powered by an engine 504 and is operated by an operator seated at an operator's station 506. The engine 504 can be of an internal combustion construction or a diesel construction generating sufficient power to propel and operate the covering system 500. At least one of the front and rear axles 510, 512 is driven by the engine 504 and is steerable to enable maneuvering of the vehicle 502. Alternatively, both axles 510, 512 can be driven and steerable for improved traction, directional control, and maneuverability around a main stack 590 of biomass bales 592. The wheels 513 can be powered by mechanical linkage to the engine 504 or powered hydraulically or pneumatically utilizing known technologies and can also include tires designed to maximize traction incorporating such features as cleats, tracks, chains, flotation configuration, etc. Individual components and subsystems of the motorized vehicle 502 and covering system 500 can be powered mechanically, electrically, hydraulically, pneumatically or a combination thereof as a result of alternative power generation systems driven by the primary engine 504. Further, the wheels 513 can be replaced by a tracked mechanism (not shown) for improved traction and drivability because of environmental and terrain conditions.

The articulated arm 520 includes a base 522 which is pivotal about a vertical post 536 affixed to the vehicle chassis 508. An extendable support arm. 528 has a first segment 529 pivotally attached to the base 522 and a second segment 530 telescopically received in the first segment 529 and selectively extendable therefrom to adjust the height of the support arm 528. The support arm 528 can be arcuately rotated about the base 522 as indicated by arrow "A". A cross arm 532 has a first segment 533 pivotally attached to the free end of the second segment 530 at mid-pivot joint 531, and a second segment 534 telescopically received in the first segment 533 and selectively extendable therefrom to adjust the length of the cross arm 532. In such a manner, the distal end 526 of the articulated arm 520 can be selectively positioned at a desired point through selective rotation of support arm 528 and cross arm 532 coupled with the pivotal rotation of the base 522 about the vertical post 536. This articulated arm 520 functions much in the same way as an arm commonly known as a 'cherry picker'. Although not shown, the articulated arm can also be configured as structures commonly known as a crane, hoist, boom, or lift which can be raised up and positioned over the main stack 590.

A tarpaulin dispensing apparatus 540 includes a head 542 attached to the distal end 526 of the articulated arm 520 and is articulable about the distal end 526. A cantilevered boom 544 extends from the head 542 and is operationally supported thereby. The cantilevered boom 544 can receive thereon a tarpaulin roll 516 to be dispensed as a covering for a biomass stack 590 by unrolling the tarpaulin sheet 518 therefrom. The head 542 in combination with the cantilevered boom 544 also includes a tensioning unit 546. The tensioning unit 546 operates to maintain a desired linear tension in the tarpaulin sheet 518 during application to the biomass stack 590. The tensioning unit 546 can be a passive mechanism relying upon fixed design features such as a preset frictional interface to maintain the linear tension in the tarpaulin sheet 518. Alternatively, the tensioning unit 546 can be actively powered (electric, hydraulic, pneumatic, etc.) in combination with force sensors (not shown) to maintain a selected tension of the tarpaulin sheet 518 during application to the biomass stack 590. One or more guides (i.e. wheels, slides, tracks, etc.) may be attached to the dispensing apparatus 540 to maintain a uniform distance between the surface to which a tarpaulin sheet 518 is being applied and the cantilevered boom 544, or to off-load weight from the dispensing apparatus 540 to the surface being covered to aid in stability of the covering system 500. The head 542, by reason of being arcuately articulable about the distal end 526 of the articulated arm 520, can rotate the cantilevered boom 544 substantially between a horizontal orientation (FIG. 12) and a vertical orientation (FIG. 15) as illustrated by arrow "B" (FIG. 12). Alternatively, the head 542 can be configured as a yoke (not shown) wherein the tarpaulin roll 516 is rotationally supported at both ends.

An integral storage rack 514 is attached to the vehicle chassis 508 to store one or more tarpaulin rolls 516 to expedite the transport of tarpaulin material to the location of the biomass bale stack 590. The integral storage rack 514 permits maneuvering of the articulated arm 520 to retrieve individual tarpaulin rolls 516 from the storage rack 514. Alternatively, but not shown, the tarpaulin rolls 516 can be stored on a trailer connected to the rear of the chassis 508 for selective retrieval by the articulated arm 520.

Figure 14:
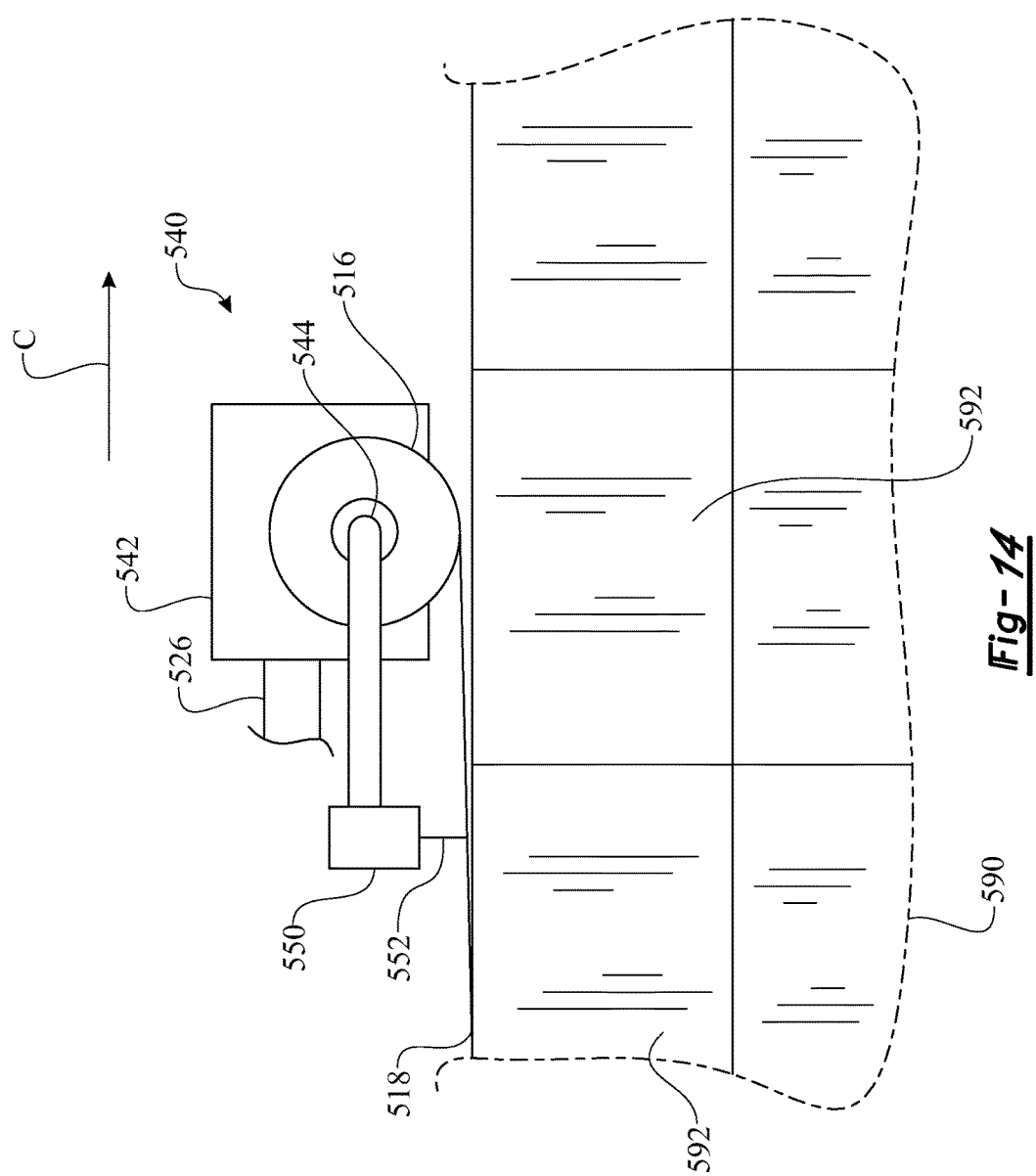
FIG. 14 presents an end elevation view of the dispensing apparatus of FIG. 13 applying the tarpaulin to a biomass stack shown in FIG. 13 and taken along the line 14-14.
Figure 15:
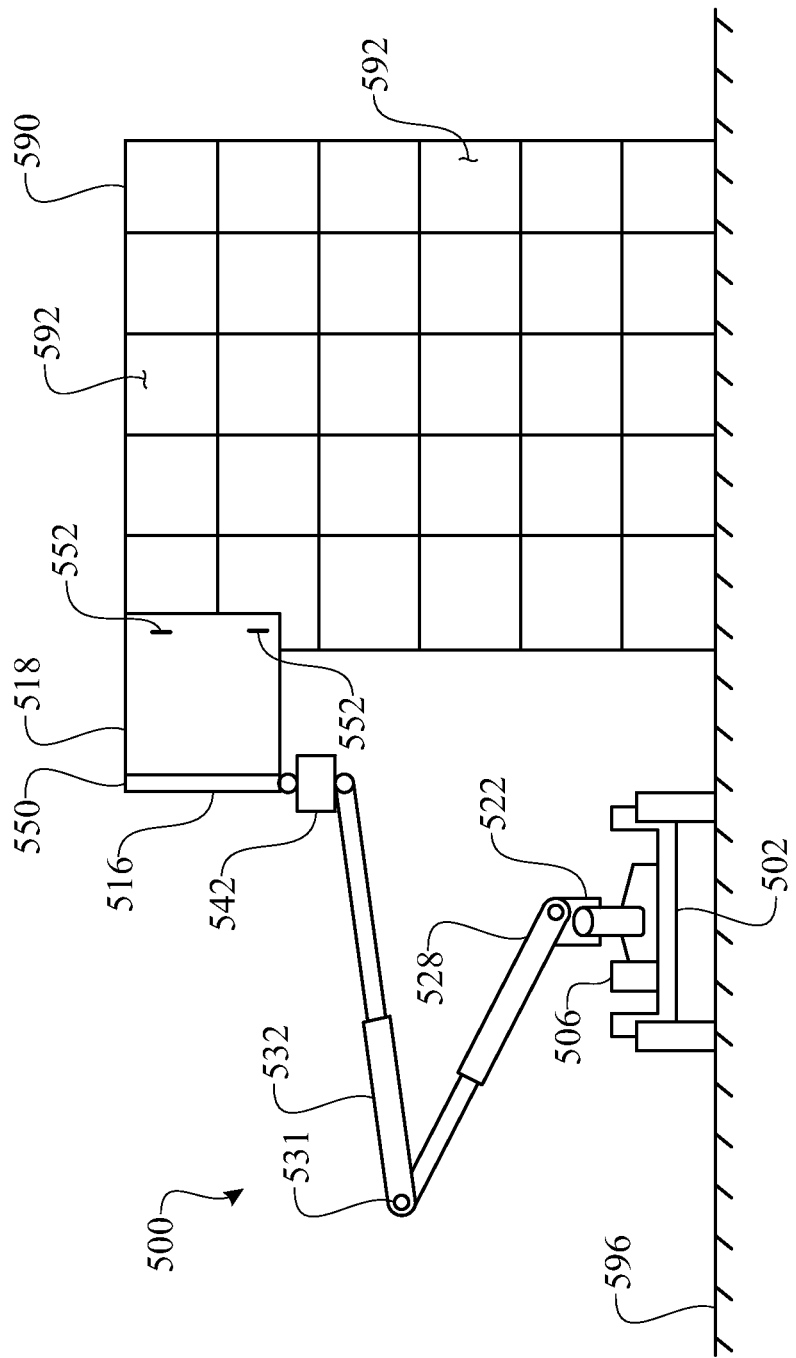
FIG. 15 presents an end elevation view of the biomass stack covering system applying a tarpaulin to an exterior side of the biomass stack.

As illustrated in FIG. 14, the tarpaulin dispensing apparatus 540 can also include a stapler 550 for automatically inserting staples 552 (FIG. 16) or spike and washer 560 (FIG. 17) through the tarpaulin sheet 518 in a systematic pattern and to secure the tarpaulin sheet 518 to the individual biomass bales 592 of the biomass stack 590. As illustrated, the stapler 550 typically trails the cantilevered boom 544 while the tarpaulin sheet 518 is unrolled from the tarpaulin roll 516. The stapler 550 has the capability of bulk loading of a plurality of fasteners such as staples 552 to facilitate the large number of fasteners used in securing the tarpaulin sheet 518 to the biomass stack 590. Prior to use, the staples 552 can be provided in bulk for sorting by vibratory sorters, fastened together by plastic strips, or other known method of bulk loading. The staples 552 and the spike and washer 560 are constructed of a "biodegradable" material. Although the staples 552 and the spike and washer 560 have a rigid construction, will not hurt equipment and are biologically degradable in a composting environment and do not harm a standard fermentation process.

If required, the covering system 500 can also be configured to remove the tarpaulin sheet 518 from a biomass stack 590 by rerolling the tarpaulin sheet 518 onto a tarpaulin roll 516 by powering the cantilevered boom in reverse. The biodegradable staples 552 and spike and washers 560 need not be removed from the biomass bales 592 as they can be processed with the biomass without impact on either pre-processing machinery or on the employed biomass processes.

Figure 16:
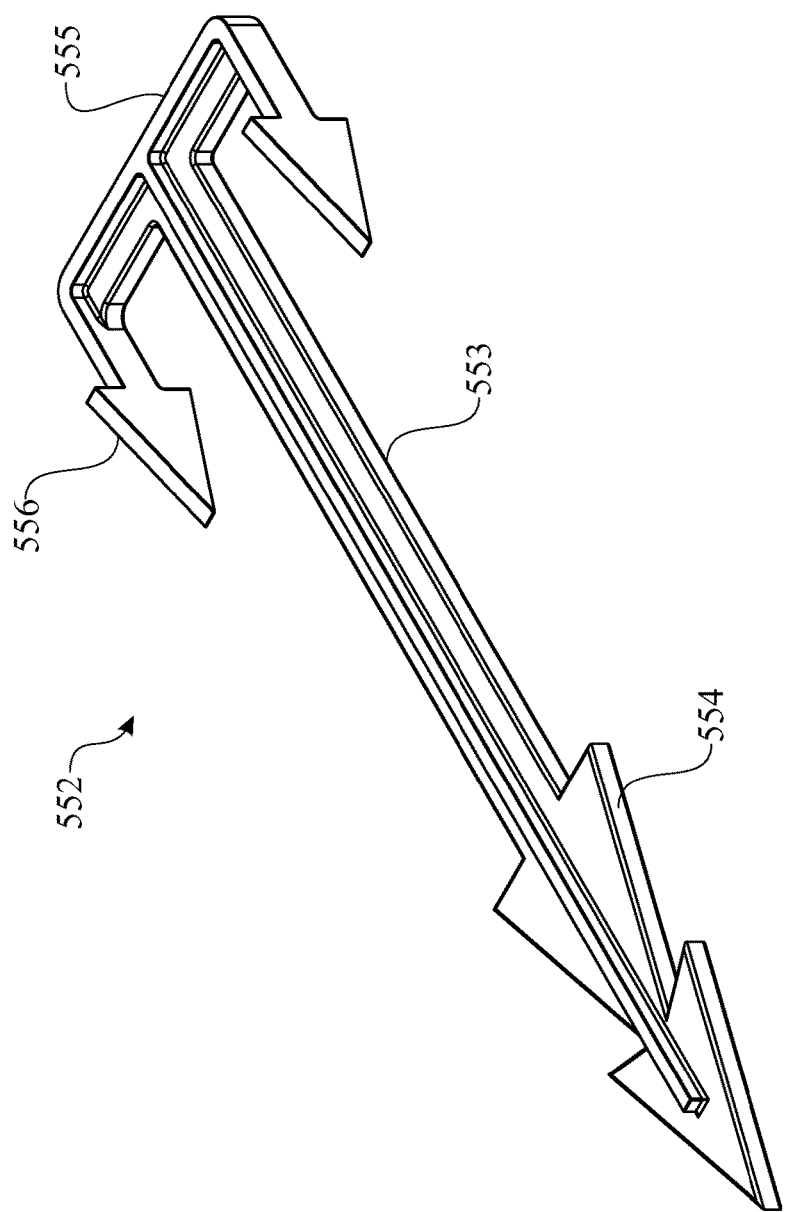
FIG. 16 presents an isometric view of a staple utilized to secure the tarpaulin to the biomass stack.
Figure 17:
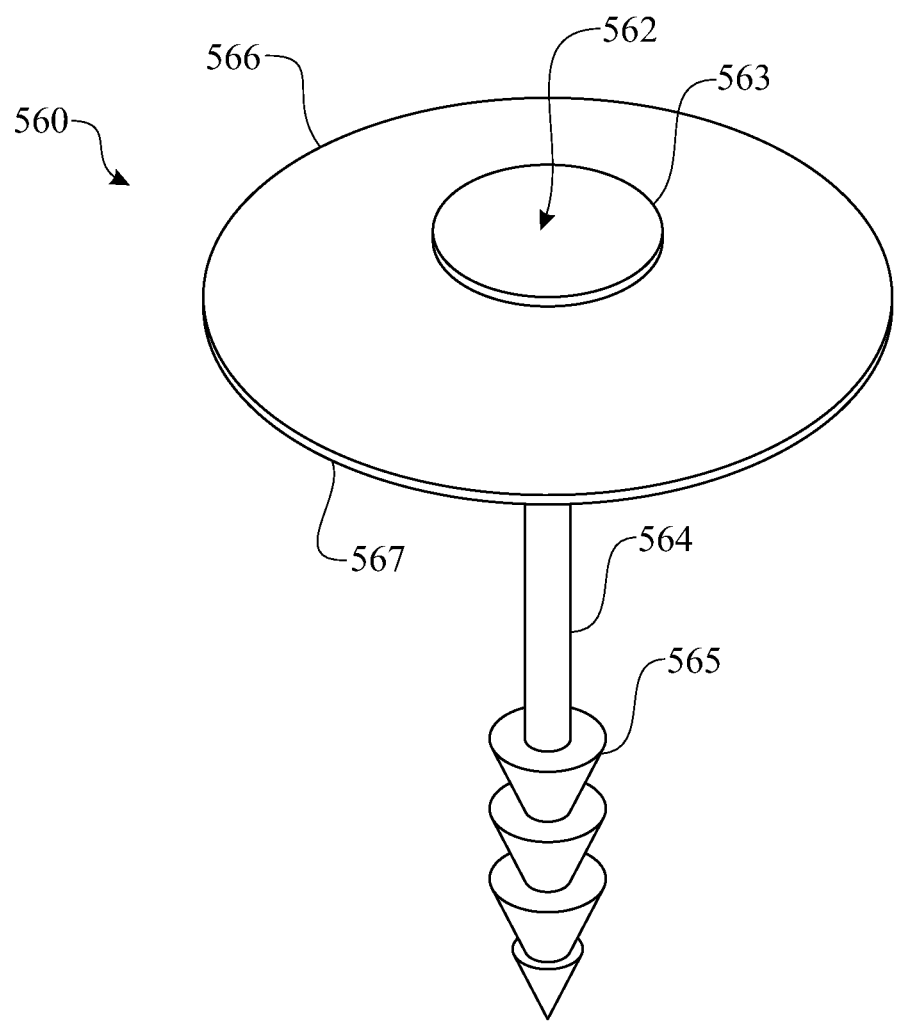
FIG. 17 presents a spike and washer utilized to secure the tarpaulin to the biomass stack.

As illustrated in FIG. 16, a typical staple 552 inserted from the stapler 550 comprises a rigid shaft 553 having a plurality of barbs 554 at a bottom end to aid in retaining the stable 552 in the biomass. A crosspiece is at a top of the shaft 553 and also includes barbs 556 extending downwardly from each end thereof to provide additional retention within the biomass. Also, as illustrated in FIG. 17, the spike and washer 560 includes a spike having a shaft 564 with a plurality of barbs 565 at a bottom and a head 563 at a top thereof. The spike 562 is inserted through the center of a large diameter washer 566. The underside 567 of the washer 566 may have a suitable adhesive applied to enhance bonding strength with the tarpaulin sheet 518 to improve tearout resistance. Further, the washers 566 may be fabricated of a self-sealing material as needed to maintain a liquid water barrier when used to secure the tarpaulin sheet 518 to the stop of the bale stack 590.

The staple 552 and the spike and washer 560 are fabricated from a biodegradable material having sufficient strength for automatic and manual insertion into the biomass bales 592 while minimizing damage to the tarpaulin sheet 518 upon insertion yet exhibiting an effective pull-out resistance to minimize the eventuality over time of the tarpaulin sheet 518 loosening from the bale stack 590. The biodegradable material is of a type that the staples 552 and the spike and washer 560 need not be removed from the individual bales 592 prior to processing. Further, the staples 552 and the spikes 560 may have one or more primary full-length legs and may have additional minor legs (not shown) for collectively securing the tarpaulin sheet 518 to the stack. These items may remain lodged within the bales 592 during processing. The design of the staple 552 and the spike and washer 560 are designed to resist the likelihood of tarpaulin sheet 518 tearout around the head of the staple 552 or the spike 560 while allowing the tarpaulin sheet 518 to easily separate from these fasteners during removal of the tarpaulin sheet 518.

The tarpaulin sheet 518 may be permanent or semi-permanent in nature. A semi-permanent biodegradable material for the tarpaulin sheet 518 has a typical life expectancy of 15-18 months. However, the biodegradability of the tarpaulin sheet 518 can be tailored to the needs of the processing facility and to the characteristics of the environmental exposure by manipulating the chemical composition of the tarpaulin sheet 518. Such tailoring thus results in a time controlled degradation rate of the tarpaulin sheet 518. The tarpaulin sheet 518 may be a single ply or a multiple ply construction depending upon the environment in which used. The tarpaulin sheet 518 may also incorporate a re-enforcing mesh when dictated by the expected environmental parameters to which the tarpaulin sheet 518 will be exposed. These factors include storage time, UV exposure, wind exposure, etc. Those biomass stacks 590 which are not deconstructed for processing by the end of the life expectancy of the tarpaulin sheet 518 may be re-covered one or more times to extend effective storage without removing the original tarpaulin sheet 518. A fire protective component may be incorporated into or applied onto the tarpaulin sheet 518 before or after application of the tarpaulin sheet 518 to the bale stack 590. Ideally, the tarpaulin sheet 518 will be impervious to liquid water but will be permeable to water vapor to facilitate the evaporation of excess moisture from the biomass bales 592 comprising the bale stack 590. In lieu of attachment to the vehicle chassis 502. The intermediary wheel 570 or tracked mechanism can be attached to the boom 540 so that the wheels 570 can ride on the upper vertical edge of the stack 590 or on the top horizontal edge of the stack 590.

For biomass stacks 590 which are stacked relatively high, the stability of the biomass stack covering system 500 can be significantly degraded when the articulated arm 520 is operating in an extended configuration. The degradation to the stability can be mitigated by incorporating a movable weight (not shown) into the chassis of the vehicle 502 to offset an increased moment caused by the extension of the articulated arm 520 and further intensified by the added weight of the tarpaulin roll 516 retained on the cantilevered boom 540. Alternatively, one or more intermediary axles 572 having intermediary wheels 570 or a tracked mechanism known in the art (not shown) rotatably mounted thereon can be affixed to the chassis 508 and selectively deployable therefrom. The intermediary wheels 570 can be laterally extendable from the chassis 508, or as shown in FIG. 14 the intermediary axle 572 can be selectively repositionable between a horizontal orientation and a vertical orientation. The intermediate wheels 570 and axles 572, when in a horizontal orientation, can broaden the effective wheelbase of the system 500 for increased stability. The use of lightweight materials (i.e. aluminum, carbon fiber, fiber composites etc.) for construction of the articulated arm 520 and the tarpaulin dispensing apparatus 540 will further minimize instability caused by extension of the articulated arm 520.

Figure 13:
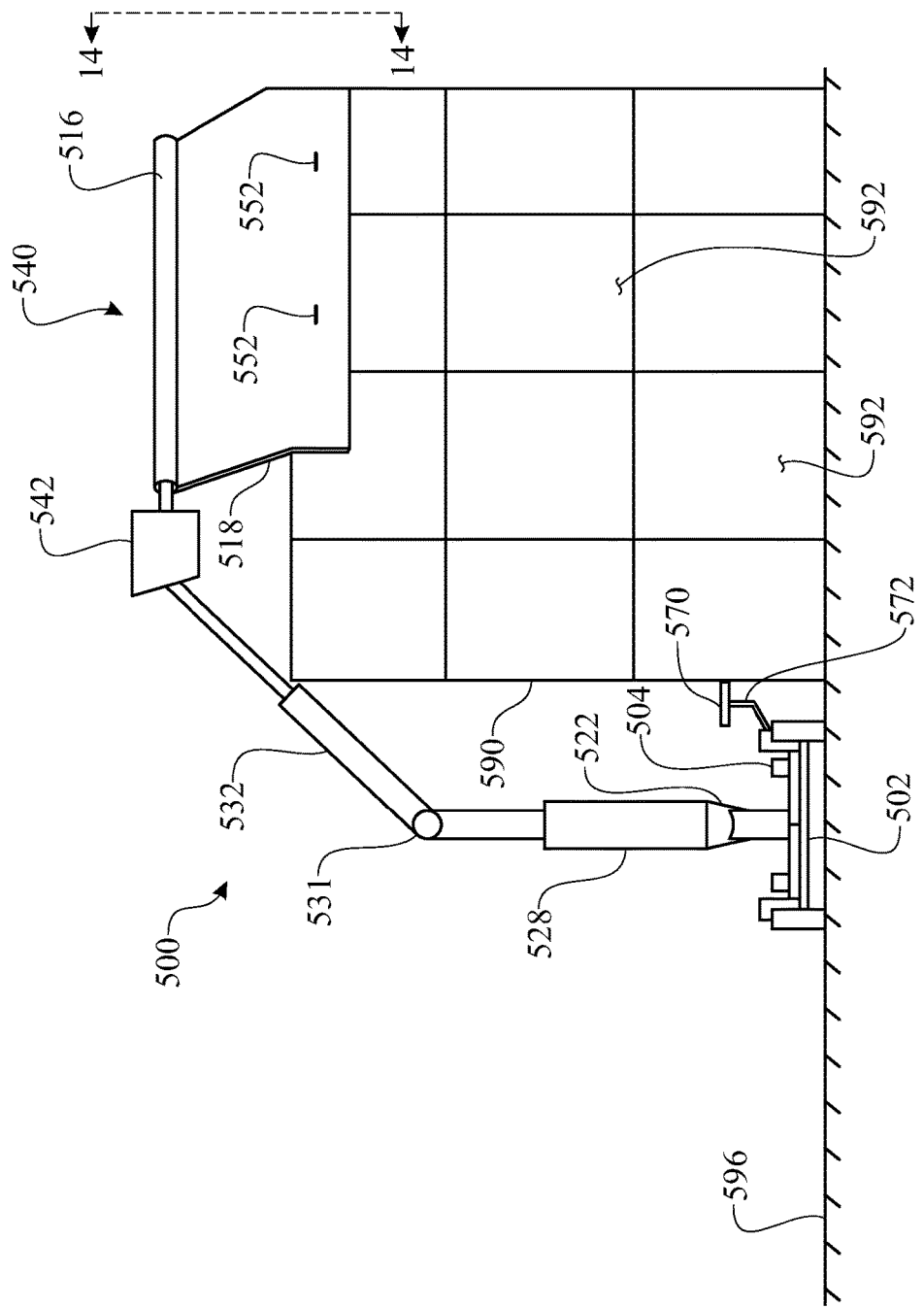
FIG. 13 presents a rear elevation view of the covering system applying a tarpaulin to a biomass stack.

The physical height of a biomass stack 590 minimizes the risk of the covering system 500 tipping over since the covering system 500 is proximate to a side of the biomass stack 590 and the articulated arm 520 will come to rest against the side of the biomass stack 590 before the system 500 can roll very far. Protective grab hooks (not shown) can be deployed while applying the tarpaulin sheet 518 at the beginning and at the end of the application process to further enhance operator safety. As illustrated in FIG. 13, positioning the intermediary axle 572 in a vertical orientation facilitates the intermediary wheel 572 ride against the inside of the biomass stack 590 to further eliminate the risk of the covering system 500 from tipping over while the tarpaulin sheet 518 is being applied to the biomass stack 590. The intermediary wheel 572 can be powered to aid in propelling the system 500 or can be unpowered and freely rotatable about the intermediary axle 572.

The biomass stack covering system 500 further includes a monitoring system 580 which monitors the slope of the ground under the biomass stack 590 and of the route around the periphery of the stack 590 traveled by the covering system 500 during application of the tarpaulin sheet 518. The monitoring system 580 also monitors the vehicle's speed, the position of the articulated arm 520, and the position of the tarpaulin roll 516 retained on the cantilevered boom 544 of the tarpaulin dispensing apparatus 540. The monitoring system 580 can account for uneven stacks, on uneven ground under the stack and beneath the covering system 500 to maintain proper position of the articulated arm 520 relative to the biomass stack 592 which the tarpaulin sheet 518 is being applied. The monitoring system 580 can further integrate additional components therein such as a global positioning system and XYZ tilt sensors to aid in fully automating the tarpaulin application process thereby enhancing operator safety and process quality.

In use, and operator is seated at the operator station 506 the motorized vehicle 502 and drives the biomass stack covering system 500 to a biomass bale stack 590. While the current disclosure is directed to a covering system utilizing a dedicated human operator, operation of the covering system may be fully or partially automated in conjunction with one or more sensor based systems. Thereby, the need for a dedicated operator can be eliminated. Since the location of a biomass bale stack 590 and its structure is defined by a stored database, the vehicle, once onsite, can utilize positional electronics such as GPS to correlate vehicle position with that of the biomass bale stack 590. For example, data from the bale tracking system 200 defines the location, orientation and physical dimensions of the stack to be covered. This data in association with additional sensor systems such as real-time imagers, distance measuring systems (laser, ultrasonic, visual, radar, etc.) would allow for fully autonomous operation.

If the sides of the biomass bale stack 590 are desired to have a tarpaulin sheet 518 applied thereto the articulated arm 520 is maneuvered to retrieve a tarpaulin roll 516 from the storage rack 514. The tarpaulin dispensing apparatus 540 is then articulated to orient the cantilevered boom 544 on which the tarpaulin roll 516 is retained to a vertical orientation. Starting at a lowermost position on the sides of the biomass bale stack 590 the stapler 550 inserts multiple biodegradable staples 552 through an end of the tarpaulin sheet 518 from the tarpaulin roll 516 to fasten the free end of the tarpaulin sheet 518 to the side of the biomass stack 590. The covering system 500 is then maneuvered by the operator about the periphery of the biomass stack 590 maintaining the tarpaulin dispensing apparatus 540 in a vertical orientation proximate to the sides of the biomass stack 590. As the covering system 500 is maneuvered about the periphery of the stack 590, the tarpaulin sheet 518 is unrolled from the tarpaulin roll 516 while a desired linear tension of the tarpaulin sheet 518 is maintained by the tensioning unit 546. The articulated arm 520 and the tarpaulin dispensing apparatus 540 are designed to deploy the tarpaulin sheet 518 in step with the motion of the vehicle 508 thereby maintaining an appropriate level of tension (or lack thereof) on the tarpaulin sheet 518. Thus, the deployment process may be passive wherein the deployment is totally dependent upon the movement of the vehicle, or alternatively the process may be active wherein the unrolling process is actively controlled to create a desired tension or slack in the tarpaulin sheet 518 as required. As the covering system 500 unrolls the tarpaulin sheet about the periphery of the biomass stack 590 the stapler 550 drives a plurality of staples in a predetermined regular pattern through the tarpaulin sheet 518 to secure the tarpaulin sheet 518 to the periphery of the biomass stack 590. Successively higher layers of tarpaulin sheet 518 are applied in the same manner while maintaining an overlap of an upper tarpaulin sheet 518 over the next most lower tarpaulin sheet 518.

Once the sides of the biomass stack 590 have been covered with tarpaulin sheet 518, the tarpaulin dispensing apparatus 540 is articulated to place the cantilevered boom 544 and the tarpaulin roll 516 in a horizontal orientation. The end of the tarpaulin sheet 518 is typically draped over the end and the sides at the top of the biomass stack 590 approximately 2-4 feet to enhance the shedding of rain water, melting snow, and other environmental elements falling upon the biomass stack 590. For example, for a biomass stack having a width of eight feet, the operator would select a tarpaulin roll 516 having a width of 10 or 12 feet and load it onto the cantilevered boom 544. The front edge of the tarpaulin sheet would be secured with a plurality of staples 552 approximately 2 feet down from the top edge. The articulated arm 520 would be raised above the top edge of the stack 590 and the covering system 500 would move forward as the tarpaulin sheet 518 is deployed. At the opposite end of the stack 590, the articulated arm 520 would position the tarpaulin dispensing apparatus 540 down the edge and allowing the tarpaulin sheet 518 to be secured approximately 2 feet down from the top. The tarpaulin sheet 518 covering the stack 590 will then be severed from the tarpaulin roll 516 by cutting, melting, etc.

As the covering system 500 deploys the tarpaulin sheet 518, the stapler 550 systematically inserts the biodegradable staples 552 through the tarpaulin sheet 518 and into the biomass bales 592 thereby securing the tarpaulin sheet 518 to the biomass stack 590. Wider stacks are covered in multiple passes with an overlapping seam. The seam can be made watertight by applying an adhesive material between the overlapping layers of tarpaulin sheet 518. The adhesive material may be independently applied or may be adhered to the edge of the tarpaulin sheet prior to deployment. The adhesive material may be an independent adhesive film, a solid adhesive, a liquid adhesive, a solvent-based bonding material, a spray adhesive etc. or alternatively the two layers may be ultrasonically bonded one to the other depending upon the physical characteristics of the tarpaulin sheet 518 and the biomass stack 590.

The film strength of the tarpaulin sheeting 518 may be systematically weakened at regular intervals corresponding to the size of the biomass bales 592 either mechanically, chemically, physically, etc. across its width either during application or during manufacturing to facilitate removal of biomass bales 592 from the larger biomass stack 590 at load-out.

The covering system 500 may also be utilized to cover the ground surface 596 upon which a stack is to be constructed utilizing a waterproof tarpaulin sheet to minimize the transfer of water from the ground to the stack. The tarpaulin sheet covering the ground may also be secured to the ground utilizing biodegradable staples 552 or spikes 560 as applied by the stapler 550. Alternative insertion systems such as portable guns (not shown) may be utilized for inserting the staples 552 or spikes 560 to fasten the tarpaulin sheet to the ground to eliminate the need for connecting hoses or power cables. For example, a pneumatically operated gun can easily be powered from a small compressed gas supply, and electrically operated gun can be powered by a battery, or, if hydraulically operated, the gun can be operated from a battery-powered hydraulic pump. These portable guns (not shown) may also be used to secure the tarpaulin sheet 518 to the biomass stack 590 where manual insertion of the staples 552 or spikes 560 is desirable.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

I claim:

1. A biomass stack covering system for applying a tarpaulin sheet on a stack of biomass bales to protect said bale stack from an environment and elements, said covering system comprising:
   a motorized vehicle having at least one steerable and driven axle;
   an articulated arm affixed to and movable with respect to said motorized vehicle, said articulated arm operably configured to extend horizontally and vertically, and to pivot at a proximal end thereof with respect to said motorized vehicle in a manner to selectively position a distal end of said articulated arm laterally exterior to a periphery of said motorized vehicle; and
   a tarpaulin dispensing apparatus operably connected to said distal end of said articulated arm, extending from said distal end in a cantilevered fashion, and articulable about said distal end to at least extend laterally from said motorized vehicle, said dispensing apparatus configured to rotationally retain a tarpaulin roll thereon and dispense a tarpaulin sheet from said tarpaulin roll onto the bale stack by unrolling said tarpaulin sheet from said tarpaulin roll.

2. The covering system according to claim 1 wherein said dispensing apparatus includes a yoke for rotationally supporting the tarpaulin roll at each end thereof.

3. The covering system according to claim 1 wherein said dispensing apparatus includes a cantilevered boom extending away from said distal end for receiving thereon the tarpaulin roll.

4. The covering system according to claim 3 wherein said boom is arcuately articulable between at least a horizontal orientation and a vertical orientation.

5. The covering system according to claim 1 wherein said motorized vehicle includes a rack for storage of at least one tarpaulin roll, the tarpaulin roll accessible and selectively removable by said cantilevered boom.

6. The covering system according to claim 1 wherein said dispensing apparatus includes a tensioning unit to maintain a linear tension of the tarpaulin sheet during application of the tarpaulin sheet to the bale stack.

7. The covering system according to claim 6 wherein said tensioning unit passively maintains a linear tension of the tarpaulin sheet during placement on the bale stack.

8. The covering system according to claim 6 wherein said tensioning unit is actively powered to maintain a selected tension of the tarpaulin sheet during placement on the bale stack.

9. The covering system according to claim 1 wherein said dispensing apparatus includes at least one stapler for insertion of a plurality of biodegradable staples through the tarpaulin sheet into the bale stack for fastening the tarpaulin sheet to the bale stack.

10. The covering system according to claim 1 further including at least one intermediary wheel rotatably mounted on a vertically oriented intermediary axle affixed to a side of said motorized vehicle and extending upwardly therefrom, said at least one intermediary wheel for bearing against a side of a bale stack to prevent said motorized vehicle from tipping when said articulated arm overbalances said motorized vehicle.

11. The covering system according to claim 1 wherein said at least one intermediary wheel is selected from the group consisting of a plurality of wheels arranged inline one with the others and a tracked mechanism.

12. The covering system according to claim 11 wherein said motorized vehicle further includes a driven and steerable rear axle.

13. The covering system according to claim 1 wherein said tarpaulin dispensing apparatus includes at least one guide wheel attached thereto for maintaining a uniform distance between said cantilevered boom and a surface to which the tarpaulin sheet is being applied.

14. A biomass stack covering system for applying a tarpaulin sheet on a stack of biomass bales to protect said bale stack from an environment and elements, said covering system comprising:
   a motorized vehicle having two drop axles, at least one said drop axle being steerable and driven;
   an articulated arm affixed to and movable with respect to said motorized vehicle, said articulated arm operably configured to extend horizontally and vertically, and to pivot at a proximal end thereof with respect to said motorized vehicle in a manner to selectively position a distal end of said articulated arm laterally exterior to a periphery of said motorized vehicle; and
   a tarpaulin dispensing apparatus operably connected to said distal end of said articulated arm, said dispensing apparatus including a cantilevered boom extending away from said distal end and articulable between at least a horizontal orientation extending laterally from said motorized vehicle and a vertical orientation, said cantilevered boom configured to rotationally retain a tarpaulin roll thereon and dispense therefrom a tarpaulin sheet onto said bale stack by unrolling the tarpaulin sheet from said tarpaulin roll, said dispensing apparatus also including a tensioning unit to maintain a linear tension of said tarpaulin during application of the tarpaulin to said bale stack.

15. The covering system according to claim 14 wherein said motorized vehicle includes a rack for storage of at least one tarpaulin roll, the tarpaulin roll accessible and selectively removable by said cantilevered boom.

16. The covering system according to claim 14 wherein said tensioning unit passively maintains a linear tension of the tarpaulin sheet during placement on the bale stack.

17. The covering system according to claim 14 wherein said tensioning unit is actively powered to maintain a selected tension of the tarpaulin sheet during placement on the bale stack.

18. The covering system according to claim 14 wherein said dispensing apparatus includes at least one stapler for insertion of a plurality of biodegradable staples through the tarpaulin sheet into the bale stack for fastening the tarpaulin sheet to the bale stack.

19. The covering system according to claim 14 further including an intermediary brace, said intermediary brace selected from the group consisting of a plurality of wheels arranged inline one with the others and a tracked mechanism, said intermediary brace rotatably mounted on at least one vertically oriented intermediary axle affixed to a side of said motorized vehicle and extending upwardly therefrom, said intermediary brace for bearing against a side of a bale stack to prevent said motorized vehicle from tipping when said articulated arm overbalances said motorized vehicle.

20. The covering system according to claim 19 wherein said intermediary axle is selectively deployable between a horizontal orientation and a vertical orientation.

* * * * *